US011040508B2

(12) United States Patent
De Graaf et al.

(10) Patent No.: US 11,040,508 B2
(45) Date of Patent: Jun. 22, 2021

(54) METHOD AND DRUM FOR MANUFACTURING A TYRE, IN PARTICULAR A RUN-FLAT TYRE

(71) Applicant: VMI HOLLAND B.V., Epe (NL)

(72) Inventors: Martin De Graaf, Ernst (NL); Dave Papot, Apeldoorn (NL)

(73) Assignee: VMI HOLLAND B.V., Epe (NL)

( * ) Notice: Subject to any disclaimer, the term of this patent is extended or adjusted under 35 U.S.C. 154(b) by 439 days.

(21) Appl. No.: 15/518,837

(22) PCT Filed: Sep. 10, 2015

(86) PCT No.: PCT/NL2015/050626
§ 371 (c)(1),
(2) Date: Apr. 13, 2017

(87) PCT Pub. No.: WO2016/060560
PCT Pub. Date: Apr. 21, 2016

(65) Prior Publication Data
US 2017/0246821 A1 Aug. 31, 2017

(30) Foreign Application Priority Data

Oct. 13, 2014 (NL) .................................. 2013627
Mar. 31, 2015 (NL) .................................. 2014555

(51) Int. Cl.
*B29D 30/24* (2006.01)
*B29D 30/20* (2006.01)
*B29D 30/26* (2006.01)

(52) U.S. Cl.
CPC ........... *B29D 30/244* (2013.01); *B29D 30/24* (2013.01); *B29D 2030/201* (2013.01); *B29D 2030/2692* (2013.01)

(58) Field of Classification Search
CPC ........ B29D 30/08; B29D 30/16; B29D 30/20; B29D 30/24; B29D 30/244; B29D 30/245;
(Continued)

(56) References Cited

U.S. PATENT DOCUMENTS 3,476,633 A   11/1969 Henley
3,844,871 A   10/1974 Habert et al.
(Continued)

FOREIGN PATENT DOCUMENTS

CN   1319053 A   10/2001
CN   1410257 A   4/2003
(Continued)

OTHER PUBLICATIONS

Japanese Office Action from JP Application No. 2017-519537, May 28, 2019.
(Continued)

*Primary Examiner* — Robert C Dye
*Assistant Examiner* — Sedef E Paquette
(74) *Attorney, Agent, or Firm* — Workman Nydegger

(57) ABSTRACT

A method for manufacturing a tyre is provided, in particular a run-flat tyre. The method includes providing a drum with a first shrink section and a second shrink section. Each shrink section is provided with a shrink surface that is radially movable. The method includes moving the shrink surfaces radially inwards with respect to the central axis from a level position to a shrink position in which the drum, at the shrink surfaces, has a circumference with a second diameter that is smaller than the first diameter, while creating a partial vacuum between the shrink surfaces and a first tyre layer at the first shrink section and the second shrink section. The method further includes shrinking the first tyre layer onto the shrink surfaces in the shrink position under the
(Continued)

influence of the partial vacuum. A drum for use in the aforementioned method is also disclosed.

31 Claims, 18 Drawing Sheets

(58) Field of Classification Search
 CPC ........ B29D 30/30; B29D 30/32; B29D 30/36; B29D 2030/105; B29D 2030/1664; B29D 2030/1671; B29D 2030/201; B29D 2030/2642; B29D 2030/265; B29D 2030/2657; B29D 2030/2671; B29D 2030/2692; B29D 2030/3064; B29D 2030/3071; B29D 2030/3207; B29D 2030/724; B29D 2030/4493
 USPC .............................. 156/110.1, 414, 415, 417
 See application file for complete search history.

(56) References Cited

U.S. PATENT DOCUMENTS

| | | | |
|---|---|---|---|
| 3,864,189 A * | 2/1975 | Galleithner | B29D 30/245 156/415 |
| 4,929,298 A | 5/1990 | Van Der Poel et al. | |
| 4,976,804 A | 12/1990 | Kneip | |
| 5,591,288 A * | 1/1997 | Becker | B29D 30/245 156/130.7 |
| 6,235,135 B1 | 5/2001 | Sergel et al. | |
| 6,863,106 B2 | 3/2005 | Currie et al. | |
| 7,128,117 B2 | 10/2006 | Currie et al. | |
| 7,287,568 B2 | 10/2007 | Roedseth et al. | |
| 7,866,359 B2 | 1/2011 | De Laubier et al. | |
| 7,887,658 B2 | 2/2011 | Sawada | |
| 8,881,785 B2 | 11/2014 | De Graaf et al. | |
| 9,511,556 B2 | 12/2016 | Denavit et al. | |
| 2001/0000582 A1 | 5/2001 | Sergel et al. | |
| 2003/0056904 A1 | 3/2003 | Currie et al. | |
| 2004/0194892 A1 | 10/2004 | Currie et al. | |
| 2005/0000624 A1 | 1/2005 | Tokunaga | |
| 2006/0011282 A1 | 1/2006 | Ogawa | |
| 2006/0137825 A1 | 6/2006 | Roedseth et al. | |
| 2006/0196589 A1 | 9/2006 | Izumoto et al. | |
| 2006/0278326 A1 | 12/2006 | Doering et al. | |
| 2007/0246164 A1 | 10/2007 | De Laubier et al. | |
| 2007/0284029 A1 | 12/2007 | Lacagnina | |
| 2008/0099127 A1 | 5/2008 | Sawada | |
| 2009/0025858 A1 | 1/2009 | Segawa | |
| 2011/0315322 A1 | 12/2011 | De Graaf et al. | |
| 2015/0000845 A1 | 1/2015 | Gervais et al. | |

FOREIGN PATENT DOCUMENTS

| | | |
|---|---|---|
| CN | 1655957 A | 8/2005 |
| CN | 1681672 A | 10/2005 |
| CN | 1960851 A | 5/2007 |
| CN | 101058234 A | 10/2007 |
| CN | 101659127 A | 3/2010 |
| CN | 102774024 A | 11/2012 |
| DE | 4232473 A1 | 4/1993 |
| EP | 0634266 A2 | 1/1995 |
| EP | 1621327 A1 | 2/2006 |
| EP | 1847380 A1 | 10/2007 |
| EP | 1847380 B1 | 6/2009 |
| GB | 1095154 A | 12/1967 |
| JP | H02167732 A | 6/1990 |
| JP | 2005238654 A | 9/2005 |
| JP | 2006175874 A | 7/2006 |
| JP | 2009028992 A | 2/2009 |
| JP | 2009034856 A | 2/2009 |
| JP | 2010052181 A | 3/2010 |
| JP | 4589326 B2 | 12/2010 |
| JP | 2012236360 A | 12/2012 |
| RU | 2531289 C2 | 10/2014 |
| SU | 540559 A3 | 12/1976 |
| WO | 03095185 A1 | 11/2003 |
| WO | 2013079544 A1 | 6/2013 |
| WO | 2015007526 A1 | 1/2015 |

OTHER PUBLICATIONS

Chinese Search Report from CN Application No. 2015800554645, dated Oct. 31, 2018.
Russian Search Report from RU Application No. 2017115747105, dated Feb. 26, 2019.
Netherlands Search Report for corresponding Netherlands Application No. 2013627, dated Jun. 30, 2015.
Netherlands Search Report for corresponding Netherlands Application No. 2014555, dated Oct. 20, 2015.
International Search Report for corresponding International PCT Application No. PCT/NL2015/050626, dated Feb. 2, 2016.
Office action from corresponding CN Application No. 201910861275.7, dated Jan. 27, 2021.

* cited by examiner

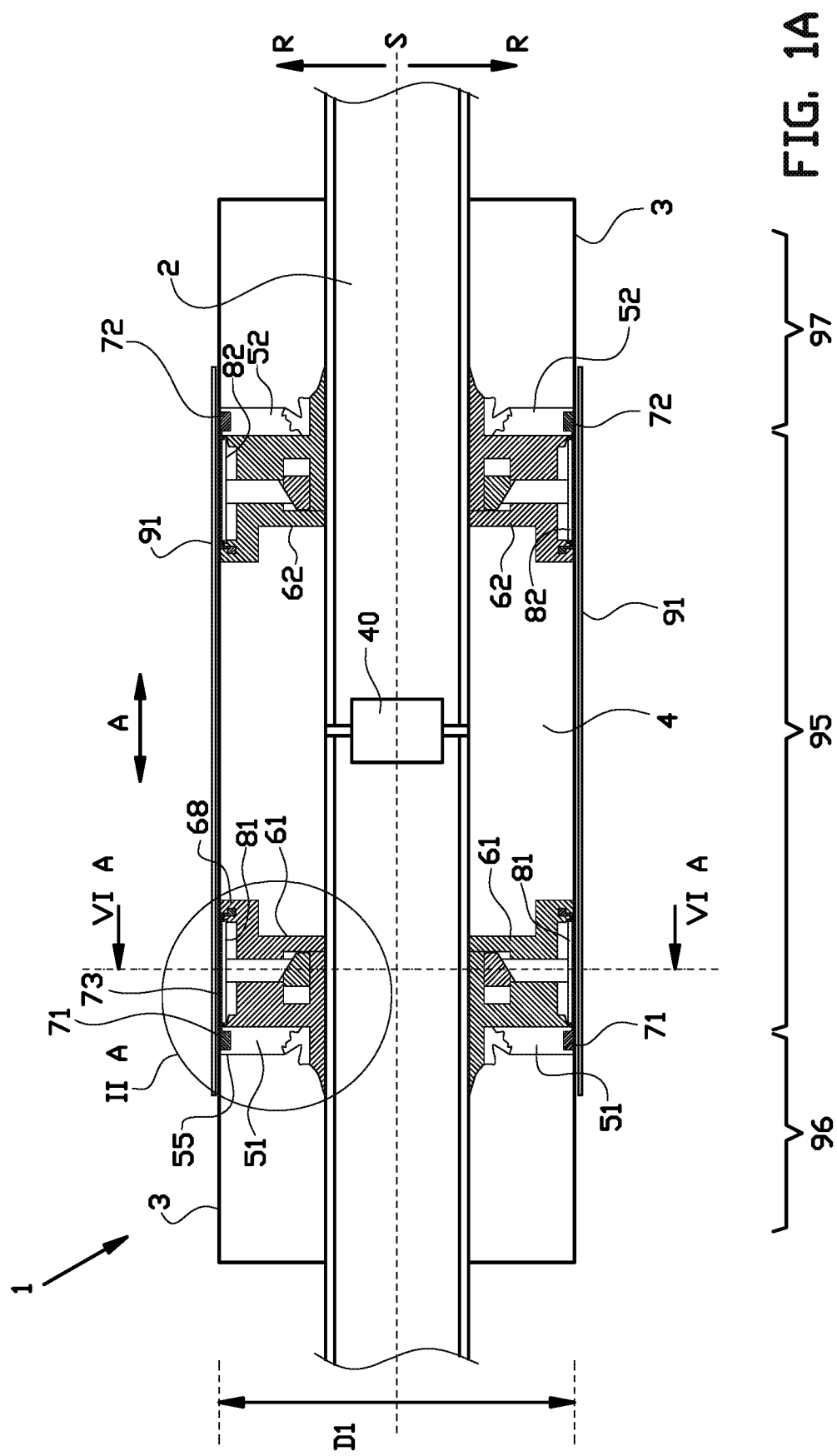

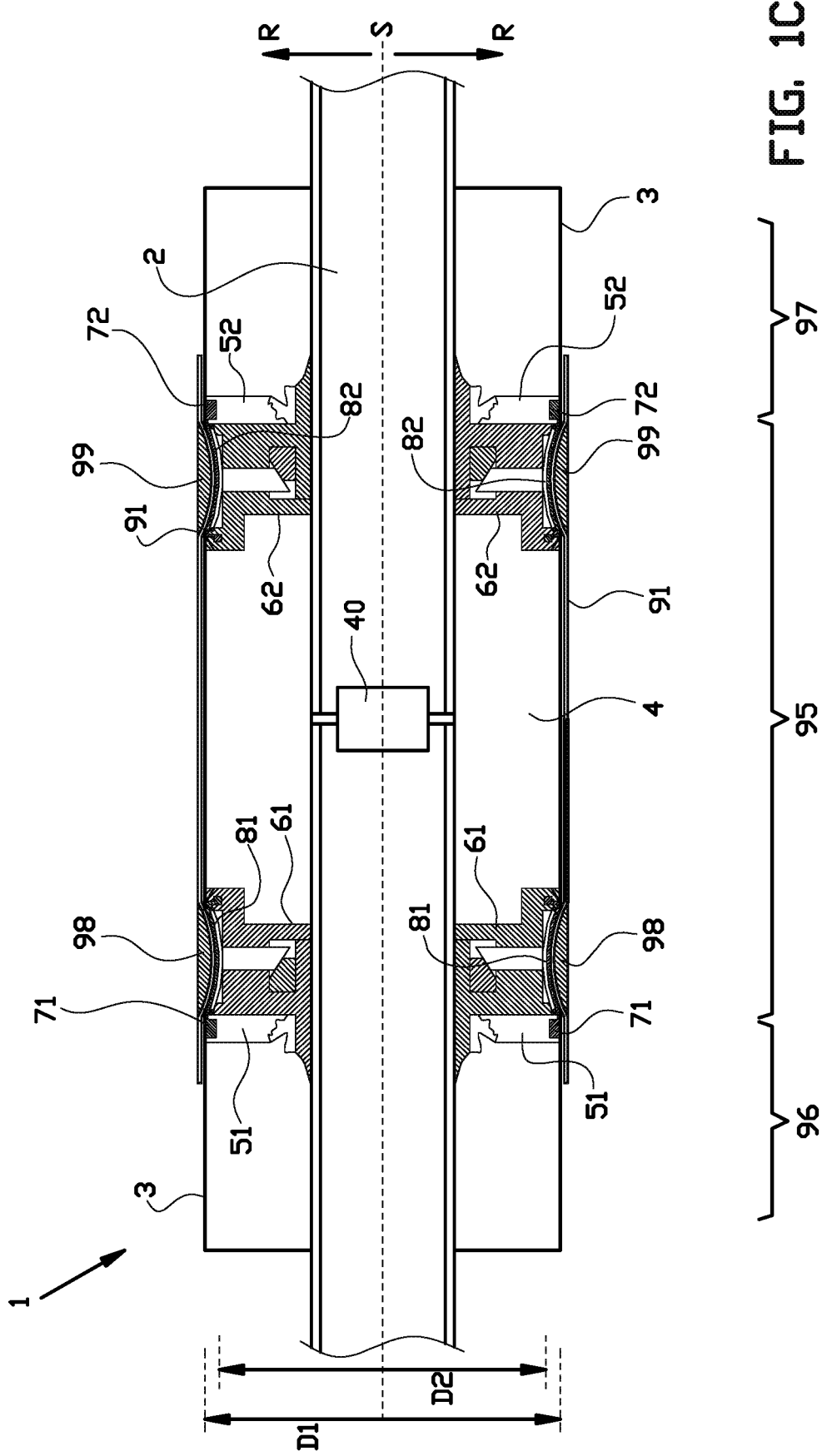

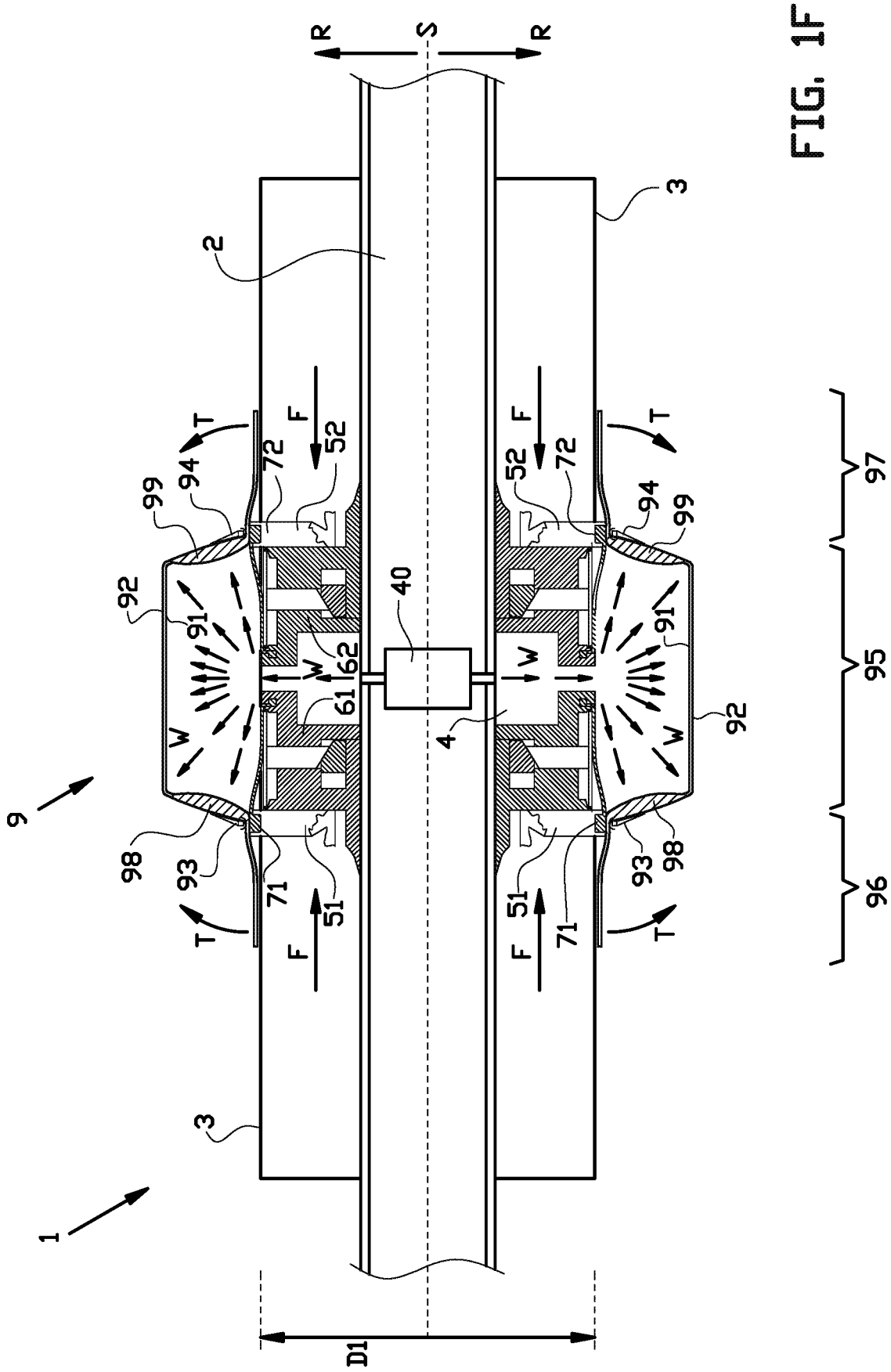

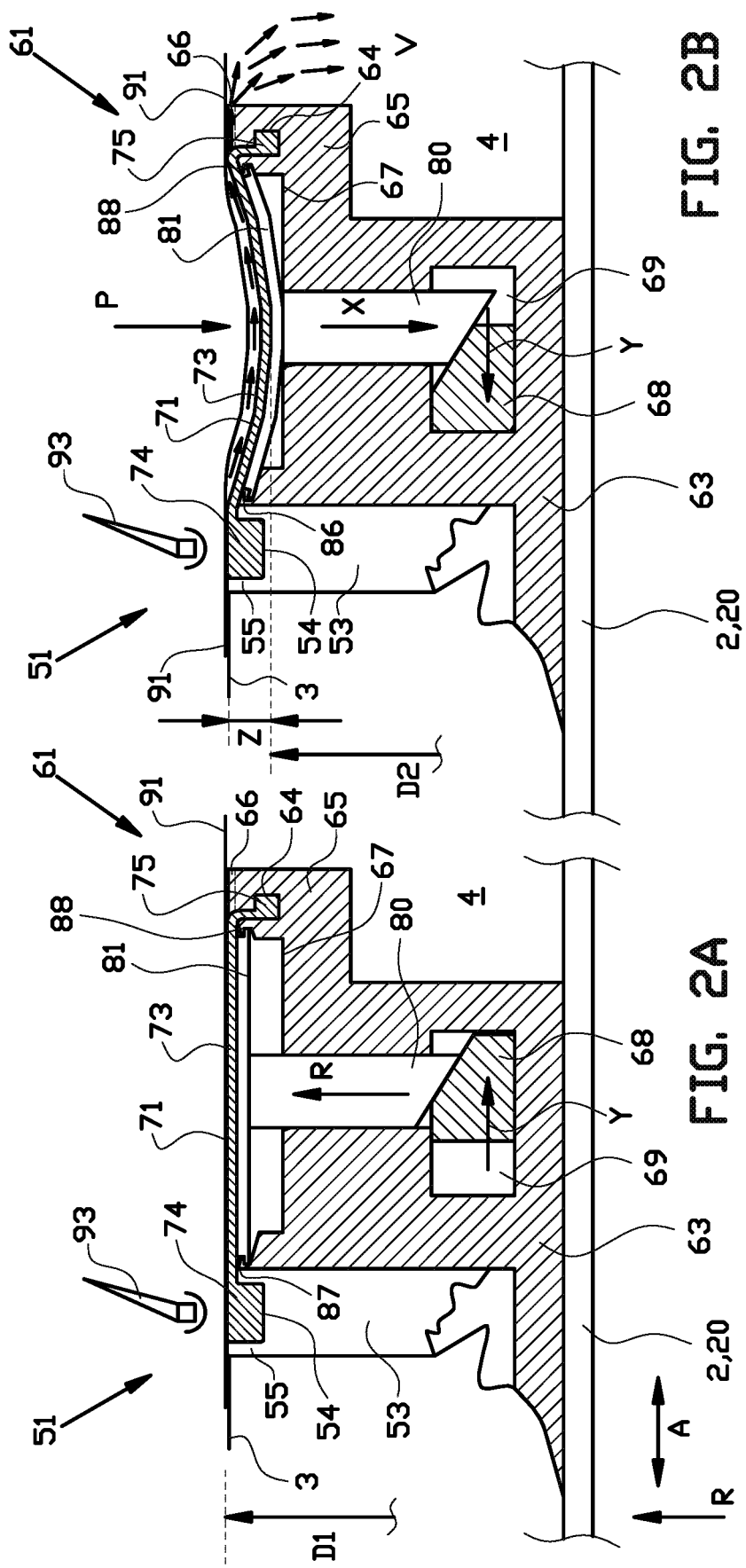

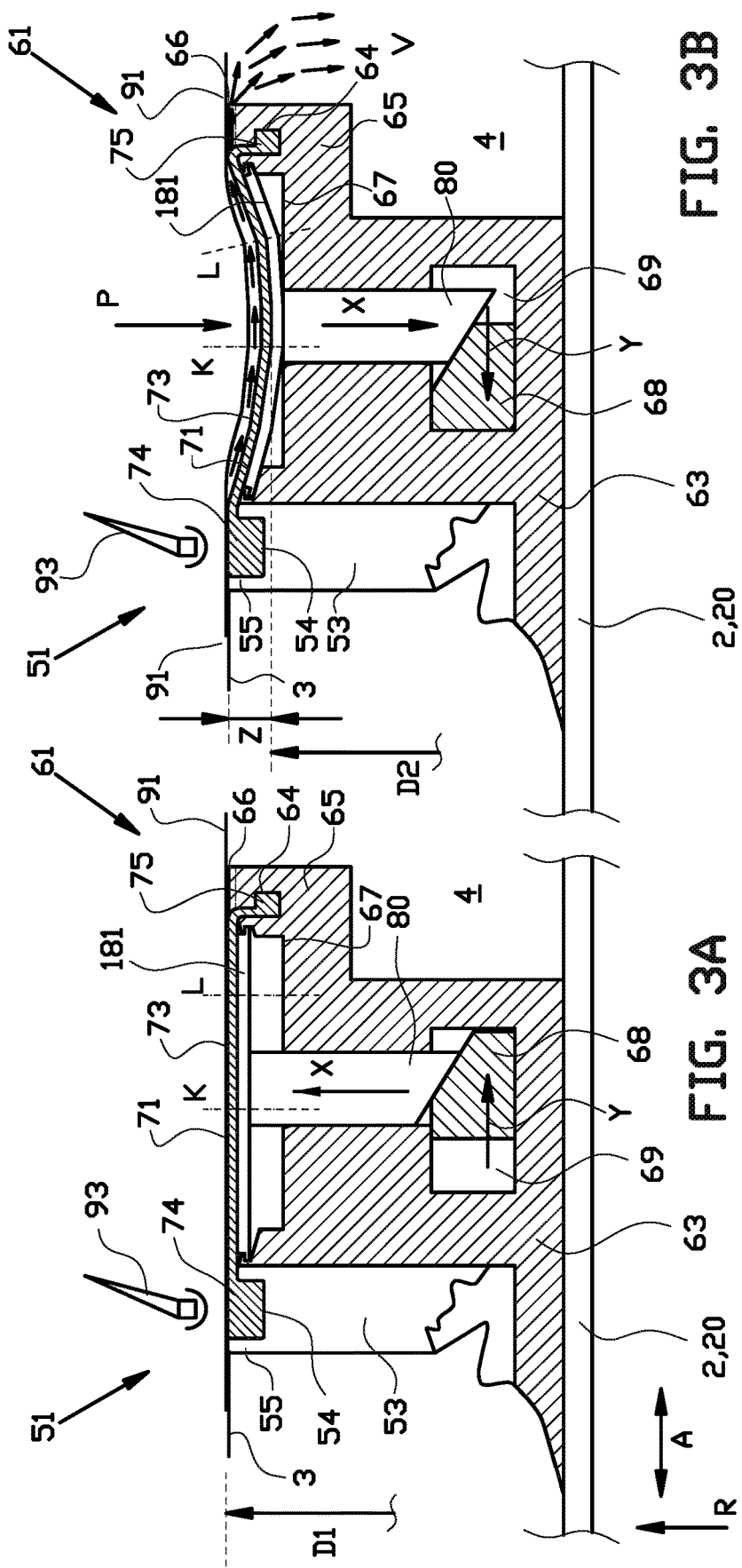

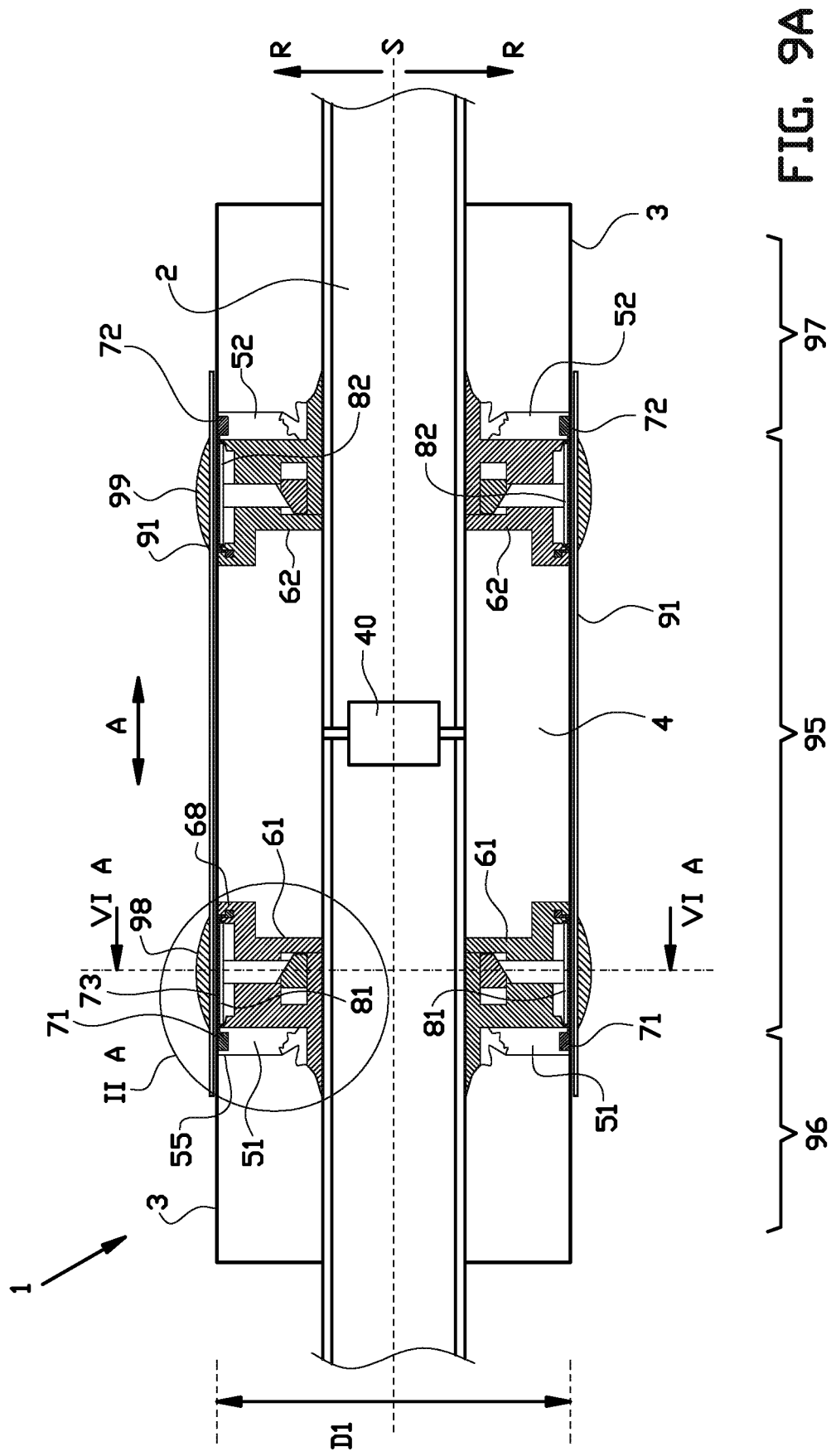

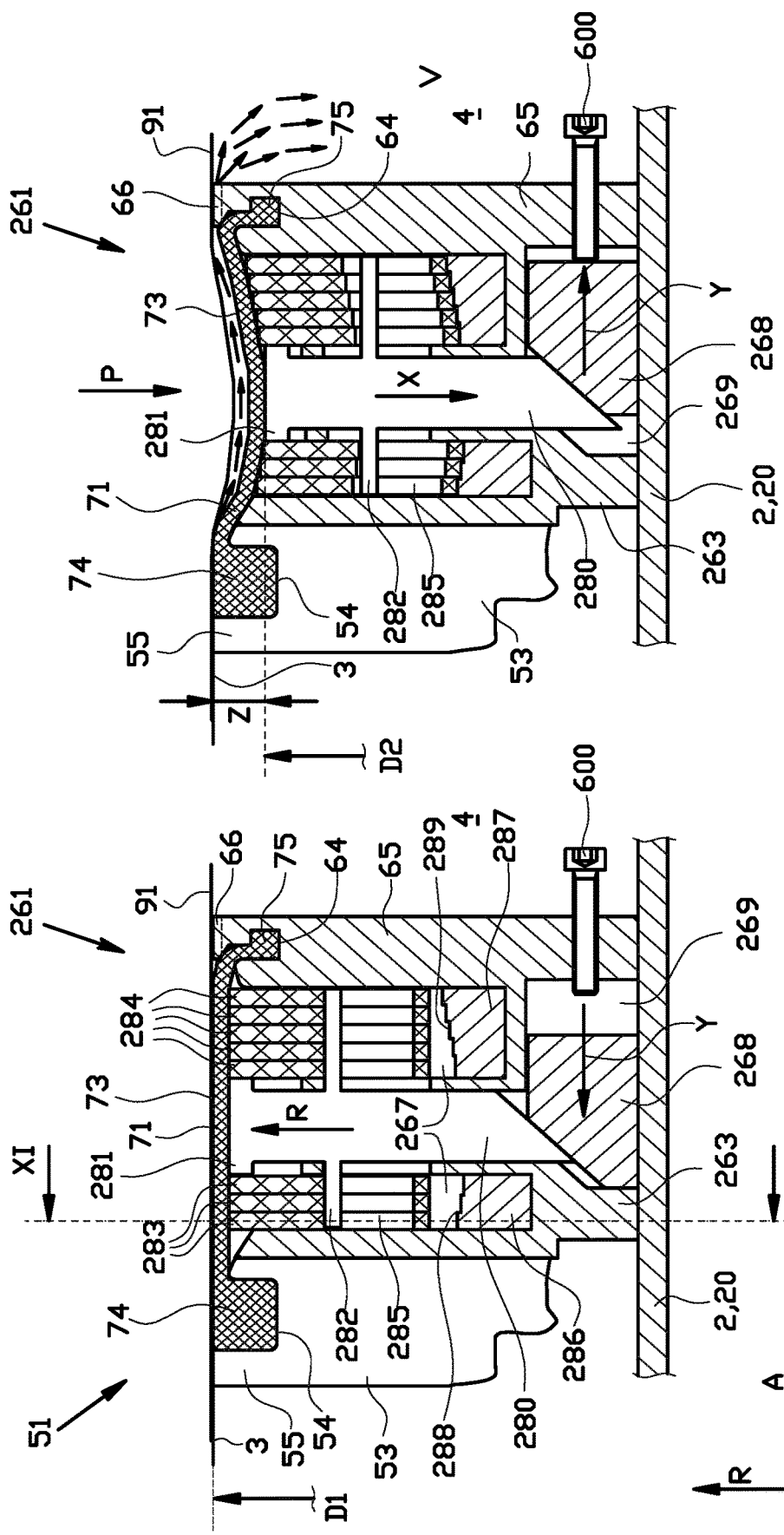

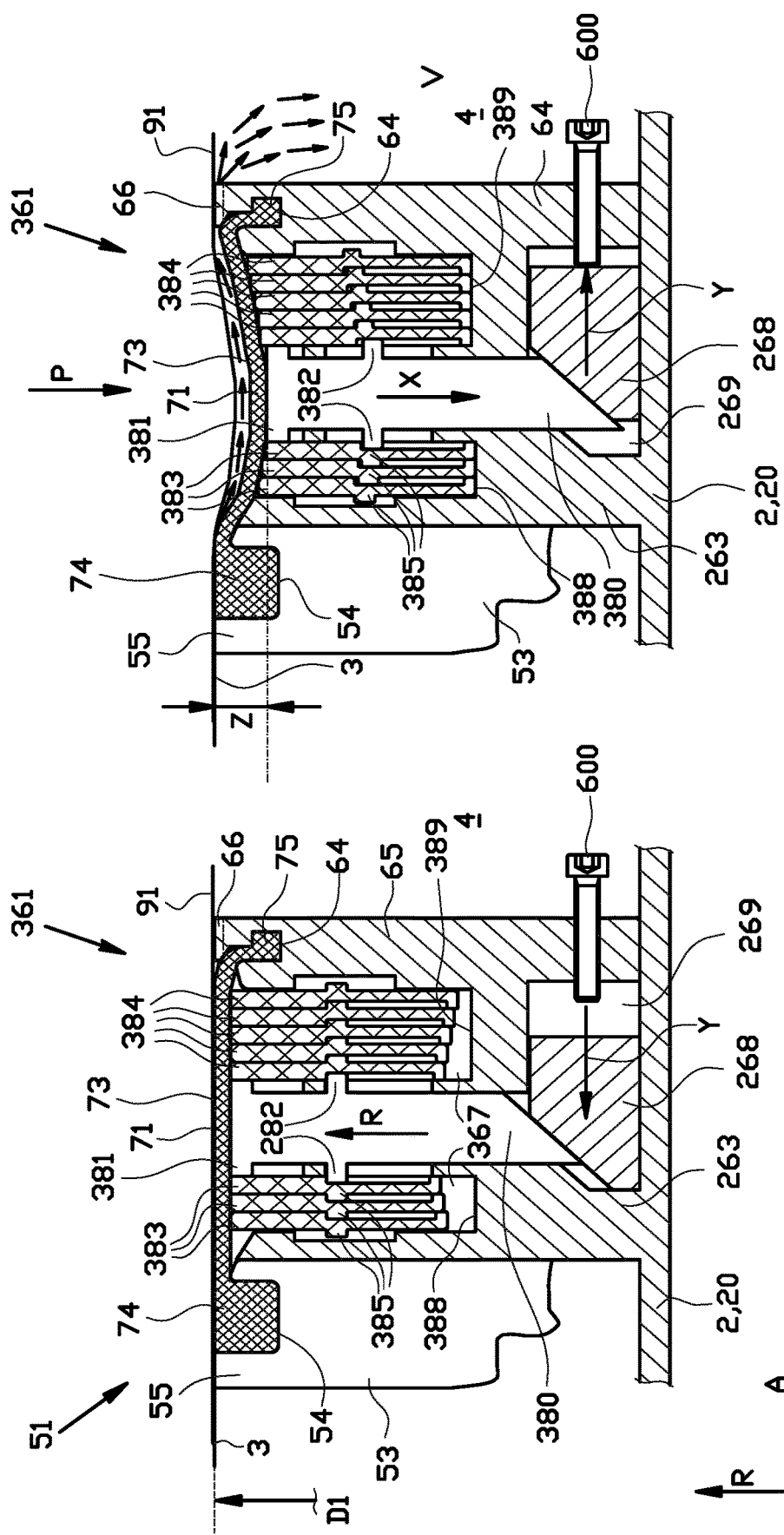

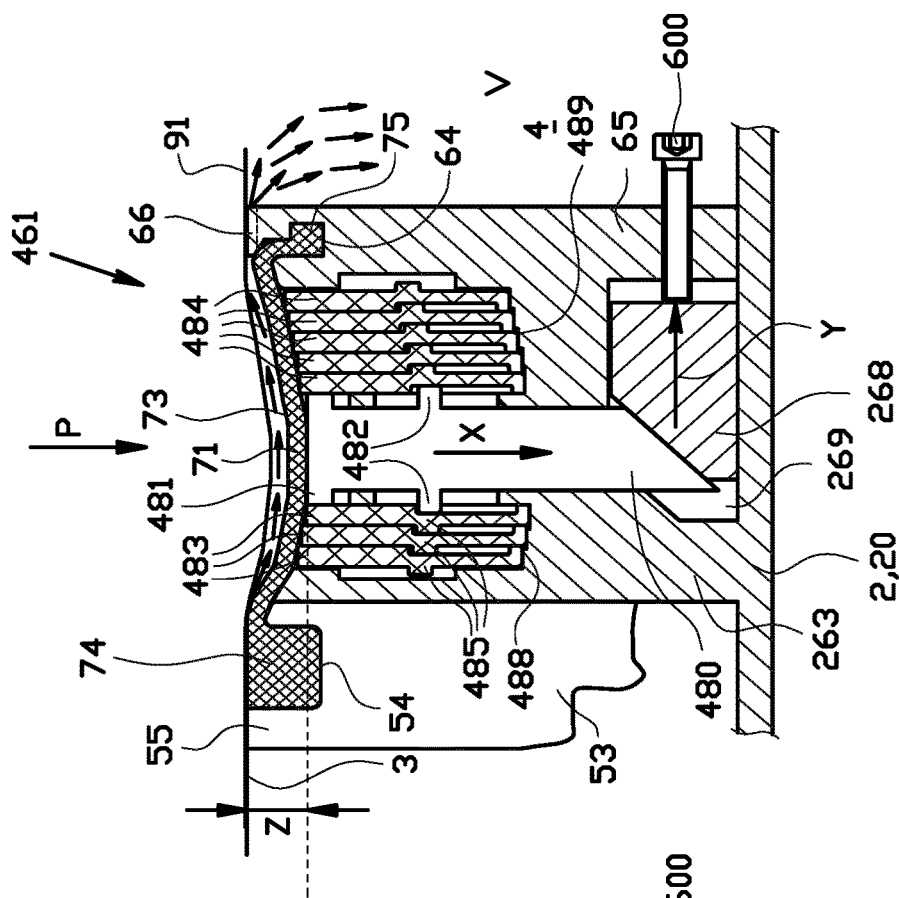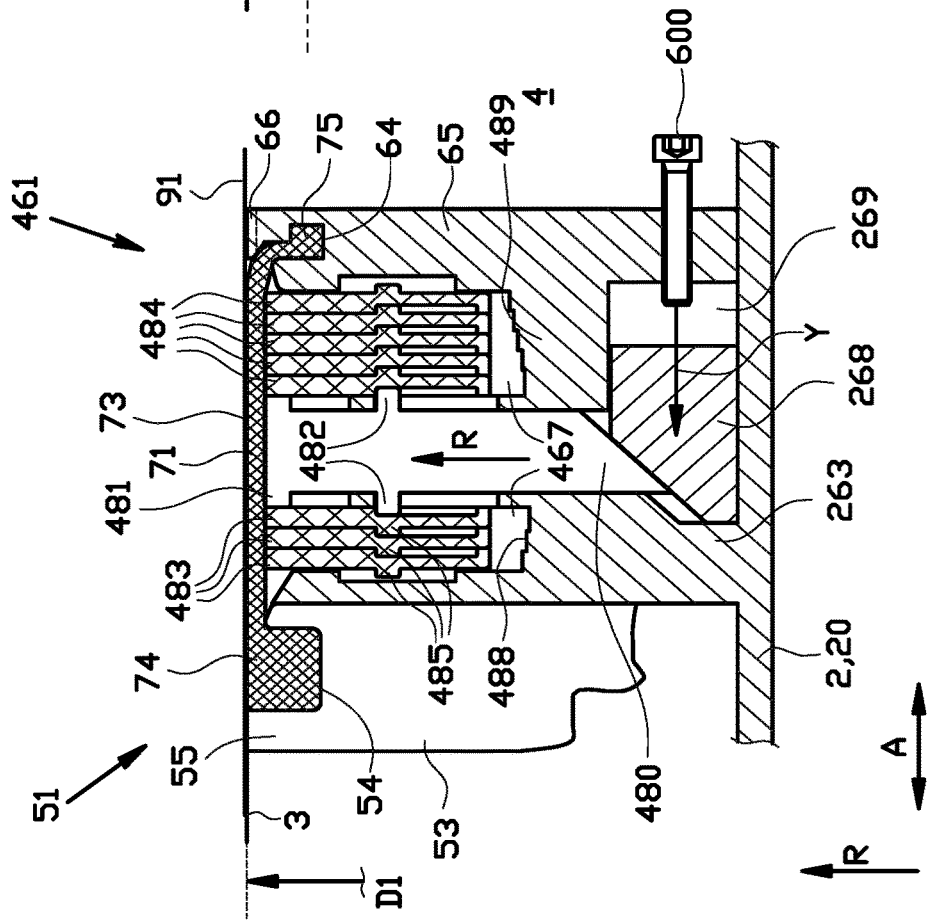

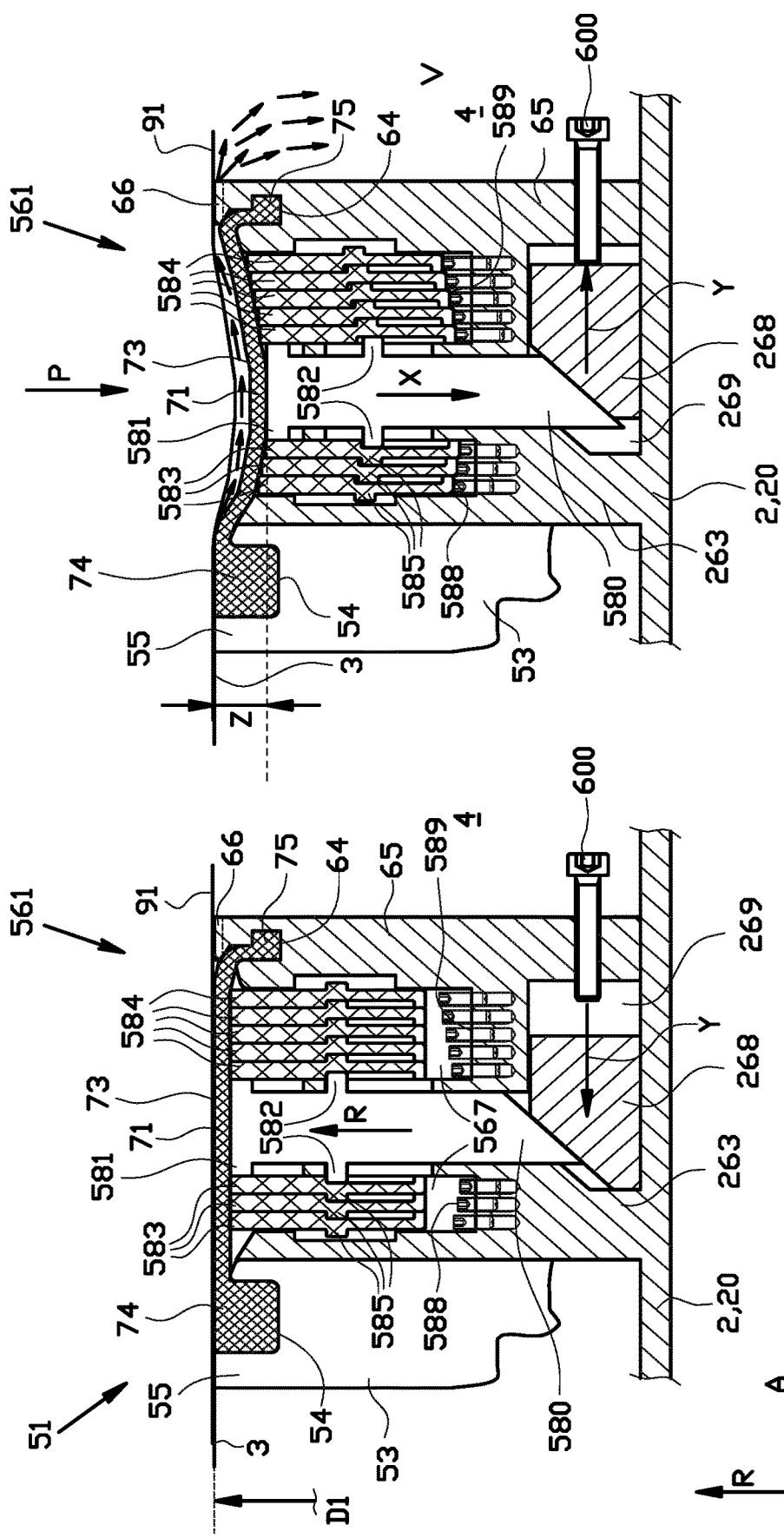

METHOD AND DRUM FOR MANUFACTURING A TYRE, IN PARTICULAR A RUN-FLAT TYRE

BACKGROUND

The invention relates to a method and a drum for manufacturing a tyre, in particular a run-flat tyre. Run-flat tyres are provided with support members in the sidewalls of the tyre in order to enhance the rigidity of the sidewalls in the event of a flat tyre, such that a car fitted with said run-flat tyres may continue running after a puncture or deflation.

EP 1 847 830 B1 discloses a variable diameter assembly drum for the manufacture of a tyre blank, the drum having a laying surface provided with circular cylindrical grooves arranged axially in a zone intended to receive profiles of great thickness, said grooves containing elastic circumferential bodies. When the drum is moved to the smallest diameter thereof, a mechanical means in the form of a rod is supported on a circumferential stop and moves the elastic body radially apart from the bottom of the groove, so as to align the radially outer surface of the elastic body with the laying surface of the drum. The laying surface is now substantially level for receiving the inner layer. As the drum moves to a second, greater diameter, the elastic bodies in the cylindrical grooves are allowed to flatten against the bottom of the groove under the effect of the circumferential elastic tensions.

WO 2013/079544 A1 discloses a variable-diameter assembly drum, similar to the assembly drum of EP 1 847 830 B1. The assembly drum has a laying surface including at least one circular groove containing a resilient circumferential sleeve that is radially spaced apart from the bottom of the groove by means of push members which are radially movable relative to the movable segments, so as to align the radially outer surface of the sleeve with the receiving surface when the drum is set to a first positioning diameter, and which engage with the base of the groove by means of resilient circumferential tension when the drum is set to a positioning diameter greater than said first positioning diameter.

JP 2010-052181 A discloses a method for manufacturing a run-flat tyre, in which a sheet-like inner liner rubber is wound around the outer peripheral surface of a drum body. Subsequently a strip of side-reinforcing rubber is wound around each of a pair of areas corresponding to the sidewall of the inner liner to form a cylindrical product. A pair of circumferential grooves is formed at the outer peripheral surface. The drum body is expanded so as to cause the part of the cylindrical product that is reinforced with the side-reinforcing rubber to be sunk into the circumferential grooves.

In all the above prior art, the inner liner is stretched considerably with the expansion of the assembly drum from a first diameter to a greater, second diameter, while at the grooves, the inner liner is forcibly pulled into the grooves. The stretching of the inner liner may cause the inner liner to deform and to behave unpredictably. Furthermore, irregularities may occur in the transition from the considerable stretching to the pulling at the groove. These irregularities may negatively influence the uniformity of the inner liner and any subsequent tyre layers disposed on top of said inner liner. Finally, it can not be guaranteed that the inner liner is completely pulled into the groove, in particular in cases where the groove is not symmetrical or the groove has sharp or abrupt angles in its cross section. If the inner liner is not completely pulled into the groove, the difference in circumference may influence the accuracy of the splicing of subsequent layers, such as the profiles of great thickness in EP 1 847 830 B1.

It is an object of the present invention to provide an alternative method and an alternative drum for manufacturing a tyre, in particular a run-flat tyre, wherein at least one of the abovementioned drawbacks is reduced.

SUMMARY OF THE INVENTION

According to a first aspect, the invention provides a method for manufacturing a tyre, in particular a run-flat tyre, comprising the step of providing a drum with a central axis and a main circumferential surface extending concentrically around said central axis at a first diameter, wherein the drum comprises a first shrink section and a second shrink section at spaced apart positions in the axial direction of the drum, wherein each shrink section is provided with a shrink surface that is radially movable, wherein the method further comprises the steps of moving the shrink surfaces of the first shrink section and the second shrink section with respect to the central axis to a level position in which the shrink surfaces are at the first diameter and subsequently arranging a first tyre layer around the main circumferential surface of the drum and extending over the shrink surfaces at the first shrink section and the second shrink section; moving the shrink surfaces radially inwards with respect to the central axis from the level position to a shrink position in which the drum, at the shrink surfaces, has a circumference with a second diameter that is smaller than the first diameter, while creating a partial vacuum between the shrink surfaces and the first tyre layer at the first shrink section and the second shrink section; and shrinking the first tyre layer onto the shrink surfaces in the shrink position under the influence of the partial vacuum.

Prior art drums, such as the variable diameter drum of EP 1 847 830 B1, are expanded radially outwards from a first diameter to a second, greater diameter while the bodies that support the reinforcement elements are allowed to flatten against the grooves in the drum under the influence of elastic tension. As a result of the diameter expansion, the entire tire layer is stretched, resulting in wrinkling and other irregularities. Although the known bodies move inwards relative to the circumferential surface of the drum, they do not move inwards relative to the central axis of the drum. In fact, the bodies in EP 1 847 830 B1 initially stay in the same radial position during the first part of the expansion and will ultimately be expanded, together with the circumferential surface towards the greater, second diameter. In contrast, the drum in the method of the invention is not expanded during the aforementioned steps of the method. Instead, only the shrink sections are shrunk with respect to the central axis of the drum.

The advantage of shrinking the first tyre layer locally at the shrink sections over stretching the remainder of the first tyre layer, as in EP 1 847 830 B1, is that only shrinking the first tyre layer locally at the respective axial locations of the shrink sections can reduce the risk of wrinkles or other irregularities forming in the rest of the first tyre layer, particularly at the transitions from the main circumferential surface to the shrink sections. Reducing the amount of irregularities that are ultimately in direct contact with one or more further tyre layers of the carcass increases the splicing accuracy of said carcass. By using a partial vacuum to suck or pull the first tyre layer onto the shrink surfaces, the conformation of the first tyre layer to the shape of the shrink surfaces in the shrink position can be improved. Furthermore, the first tyre layer can behave more predictably during shrinking as the first tyre layer is typically already stretched at the first diameter. For at least a part of the shrinking of the first tyre layer, the first tyre layer can simply be allowed to return to its original, unstretched state. The net amount of shrinking can thus be considerably less than the extra amount of stretching that would be required in the prior art.

In an embodiment the main circumferential surface of the drum remains at the first diameter during the movement of the shrink surfaces from the level position to the shrink position. Thus, the part of the first tyre layer being affected by the shrinking can be reduced to the areas at the shrink sections only.

In an embodiment the shrink surfaces are level or substantially level with the main circumferential surface in the level position. The first tyre layer can thus be applied and stitched on a level circumferential surface, without the shrinking surfaces affecting the accuracy of the splicing.

In an embodiment the method further comprises the step of arranging a first reinforcement strip and a second reinforcement strip around the first tyre layer at the shrink surfaces of the first shrink section and the second shrink section, respectively. The reinforcement strip can enhance the rigidity or stiffness of the run-flat tyre that is ultimately manufactured.

In an embodiment the shrink surfaces, in the shrink position, are recessed with respect to the level position over a shrink distance that is substantially equal to the thickness of the respective reinforcement strip. By applying the reinforcement strips at the shrink surfaces, the shrinking can be used to sink or lower the reinforcement strips over the shrink distance into the shrink position in which the radially outer surfaces of the reinforcement strips are substantially level with first tyre layer at the main circumferential surface of the drum.

In an alternative embodiment the shrink surfaces, in the shrink position, are recessed with respect to the level position over a shrink distance that is less than the thickness of the respective reinforcement strip. The reinforcement strips may therefore slightly protrude with respect to the first tyre layer, thereby allowing the reinforcement strips to be securely pressed into the cavity formed by the shrink surfaces, e.g. by a pressure wheel.

In an embodiment the shrink surfaces are moved to the shrink position prior to the arranging of the first reinforcement strip and the second reinforcement strip around the first tyre layer at the shrink surfaces of the first shrink section and the second shrink section, respectively. Thus, the first tyre layer can be drawn onto the shrink surfaces under the influence of the partial vacuum, without being hindered by the presence of the reinforcement strips.

In an alternative embodiment the first reinforcement strip and the second reinforcement strip are arranged around the first tyre layer at the shrink surfaces of the first shrink section and the second shrink section, respectively prior to the shrink surfaces moving to the shrink position. This embodiment can be particularly useful when it is expected that the placement of the reinforcement strips on the already shrunk shrink surfaces will likely cause air to be trapped in pockets between the first tyre layer and the reinforcement strips. Placing the reinforcement strips on the first tyre layer while the first tyre layer is still held level, can reduce the amount of air pockets.

In an embodiment the method further comprises the step of arranging one or more further tyre layers around the first tyre layer, the first reinforcement strip and the second reinforcement strip for forming a carcass in which the first reinforcement strip and the second reinforcement strip are arranged between the first tyre layer and the one or more further tyre layers in the radial direction. The reinforcement strips can thus form an integral part of the carcass to enhance the rigidity or stiffness of the tyre or the run-flat tyre.

In an embodiment the method further comprises the step of arranging a first bead and a second bead around the one or more further tyre layers, wherein the first shrink section and the second shrink section are positioned axially between the first bead and the second bead, wherein the method further comprises the step of shaping the part of the carcass that is positioned axially between the first bead and the second bead. In a preferred embodiment thereof the shaping comprises the steps of providing a shaping section between the first shrink section and the second shrink section and creating an overpressure in the shaping section for inflating the part of the carcass axially between the first bead and the second bead. The carcass of the run-flat tyre can thus be built and formed at the same drum. The drum can thus be considered an uni-stage or single stage drum.

In an embodiment the shaping section, the first shrink section and the second shrink section are arranged in fluid communication, wherein the step of creating a partial vacuum between the shrink surfaces and the first tyre layer at the first shrink section and the second shrink section comprises creating a partial vacuum in the shaping section and allowing the partial vacuum in the shaping section to draw air from between the shrink surfaces and the first tyre layer at the first shrink section and the second shrink section. The shaping section can thus be used to form a partial vacuum which communicates with the shrink sections. Advantageously, the shaping section can be used for both shaping with overpressure and for shrinking at the shrink sections with the partial vacuum.

According to a second aspect, the invention provides a drum for manufacturing a tyre, in particular a run-flat tyre, comprising a central axis and a main circumferential surface extending concentrically around said central axis at a first diameter, wherein the drum is provided with a first shrink section and a second shrink section at spaced apart positions in the axial direction of the drum, wherein each shrink section is provided with a shrink surface that is movable between a level position in which the shrink surface is level with the main circumferential surface of the drum at the first diameter and a shrink position in which the shrink surface is moved radially inwards with respect to the central axis from the level position to a shrink position in which the drum, at the shrink surfaces of the first shrink section and the second shrink section, has a circumference with a second diameter that is smaller than the first diameter, wherein the drum is arranged for receiving a first tyre layer around the main circumferential surface and extending over the shrink surfaces at the first shrink section and the second shrink section, wherein the drum is further provided with an air pump device that is operationally connected to the shrink sections for creating a partial vacuum between the shrink surfaces and the first tyre layer.

This again has the advantage only shrinking the first tyre layer locally at the respective axial locations of the shrink sections, which can reduce the risk of wrinkles or other irregularities forming. Similarly to the method, the use of a partial vacuum can improve the conformation of the first tyre layer to the shape of the shrink surfaces in the shrink position. Finally, the first tyre layer can behave more predictably during shrinking as the first tyre layer is typically already stretched at the first diameter.

In an embodiment the main circumferential surface of the drum is arranged to remain at the first diameter during the movement of the shrink surfaces from the level position to the shrink position.

In an embodiment the shrink surfaces are level or substantially level with the main circumferential surface in the level position. Thus, the part of the first tyre layer being affected by the shrinking can be reduced to the areas at the shrink sections only.

In an embodiment the drum is arranged for receiving a first reinforcement strip and a second reinforcement strip around the first tyre layer at the shrink surfaces of the first shrink section and the second shrink section, respectively, wherein the shrink surfaces, in the shrink position, are recessed with respect to the level position over a shrink distance that is substantially equal to the thickness of the respective reinforcement strip. By receiving the reinforcement strips at the shrink surfaces, the shrinking can be used to sink or lower the reinforcement strips over the shrink distance into the shrink position in which the radially outer surfaces of the reinforcement strips are substantially level with first tyre layer at the main circumferential surface of the drum.

In an alternative embodiment, the drum is arranged for receiving a first reinforcement strip and a second reinforcement strip around the first tyre layer at the shrink surfaces of the first shrink section and the second shrink section, respectively, wherein the shrink surfaces, in the shrink position, are recessed with respect to the level position over a shrink distance that is less than the thickness of the respective reinforcement strip. The reinforcement strips may therefore slightly protrude with respect to the first tyre layer, thereby allowing the reinforcement strips to be securely pressed into the cavity formed by the shrink surfaces, e.g. by a pressure wheel.

Preferably, the cross sectional shape of the shrink surfaces in the shrink position substantially corresponds to the cross sectional shape of the combined first tyre layer and the respective reinforcement strip. Matching the shape of the shrink surfaces to the shape of the reinforcement strips further increases the uniformity or leveling of the reinforcement strips with respect to the first tyre layer in the shrink position.

In an embodiment the shrink surfaces, at the side thereof facing the first tyre layer, are provided with venting elements which are arranged to create venting spaces between the first tyre layer and the shrink surfaces to allow air to be drawn from between the first tyre layer and the shrink surfaces. The venting element thus further improves the ability the air pump device to draw air from between the first tyre layer and the shrink surfaces.

In an embodiment the drum is provided with a first sealing portion at each of the shrink sections, wherein each of the first sealing portions is arranged to abut the first tyre layer in a sealing manner at one of the ends of the respective shrink section in the axial direction. The first sealing portion can prevent air from reentering the shrink sections after the partial vacuum has been created, thereby improving the effectiveness of the partial vacuum.

In an embodiment the drum is provided with a second sealing portion at each of the shrink sections, wherein each of the second sealing portions is arranged to abut the first tyre layer in a sealing manner at the end of the respective shrink section in the axial direction opposite to the respective first sealing portion. The second sealing portion can, in cooperation with the first sealing portion, prevent air from reentering the shrink sections after the partial vacuum has been created, thereby improving the effectiveness of the partial vacuum.

In an embodiment the air pump device is operationally connected to the first shrink section and the second shrink section for creating a partial vacuum between the shrink surfaces, the first tyre layer, and the first sealing portion and the second sealing portion of the respective shrink sections.

In an embodiment the first sealing portions or the second sealing portions are provided with fluid connections for operationally connecting the air pump device to the areas between the shrink surfaces, the first tyre layer, the first sealing portion and the second sealing portion of the respective shrink section. The fluid connections allow for air to be drawn from said areas through one of the sealing portions.

In an embodiment the drum is provided with a shaping section between the first shrink section and the second shrink section in the axial direction, wherein the air pump device is operationally connected to the shaping section, wherein the shaping section is arranged in fluid communication with the first shrink section and the second shrink section. In a preferred embodiment the fluid connections connect the shaping section in fluid communication to the areas between the shrink surfaces of the respective shrink sections and the first tyre layer and the first sealing portion and the second sealing portion. The shaping section can thus be used to form a partial vacuum which communicates with the shrink sections. Advantageously, the shaping section can be used for both shaping with overpressure and for shrinking at the shrink sections with the partial vacuum.

In an embodiment the air pump device comprises a reversible air pump that is arranged to alternately draw air or supply air, or wherein the air pump device comprises a plurality of air pumps for supplying and drawing air. The air pump device can thus be used for both shaping and shrinking.

In an embodiment the shrink surfaces of the first shrink section and the second shrink section are formed by a first sealing member and a second sealing member, respectively, extending with elastic tension around the radial outside of the first shrink section and the second shrink section, respectively. The elastic tension in the sealing members ensures that the sealing members are tightly arranged around the drum at the respective shrink sections. As a result, the sealing of the respective shrink sections with respect to the first tyre layer can be improved.

In a preferred embodiment thereof, the first sealing member and the second sealing member are evenly stretched around the radial outside of the first shrink section and the second shrink section, respectively. This can improve the evenness of the shrinking of the sealing members in the circumferential direction during the movement of the shrink surfaces from the level position to the shrink position.

In an embodiment the first shrink section and the second shrink section are provided with plurality of first support plates and a plurality of second support plates, respectively, evenly distributed in the circumferential direction around the respective shrink sections and arranged radially inside and radially movable with respect to the respective shrink surface for supporting said respective shrink surface in the level position and the shrink position.

In an embodiment the first support plates and the second support plates are arranged to be resiliently flexible in the radial direction between a first state for supporting the respective shrink surface in the level position and a second state for supporting the respective shrink surface in the shrink position.

In an embodiment the first support plates and the second support plates are arranged to be moved by an actuator from the second state to the first state. The support plates can thus be actively moved to and kept in the first state, thereby securely supporting the shrink surface in the level position.

In an embodiment the first support plates and the second support plates are biased to return from the first state to the second state, preferably wherein the second state is the natural state of the first support plates and the second support plates. The support plates can thus be allowed to return to the second state, without the use of external actuators. In combination with the elastic sealing members, the shrink surfaces will tend to follow the radially inward movement of the support plates.

In an embodiment each support plate of the plurality of first support plates and the plurality of second support plates is provided with longitudinal edges facing the directly adjacent support plate in the circumferential direction of the drum, wherein the longitudinal edges are concave in the first state of the support plate to allow for the support plates to approach each other in the second state at the smaller second diameter. This reduces the chance of interference between the support plates at the smaller, second diameter.

In an embodiment each support plate of the plurality of first support plates and the plurality of second support plates is weakened to change the behavior of the support plate during the return movement from the first state to the second state. Preferably, the support plate is weakened at asymmetrical positions along its length in the axial direction of the drum, to provide an asymmetrical shape of the support plate in the second state. Thus, multi-planar or asymmetrical cross sectional shapes can be achieved, to accommodate similarly shaped reinforcement strips.

In an embodiment the first shrink section and the second shrink section are each provided with a plurality of profile segments that are placed adjacently to each other in a direction parallel to the central axis, wherein the plurality of profile segments are arranged to be individually movable in the radial direction between a level position in which all the profile segments extend up to the same radial distance from the central axis and a retracted position in which the profile segments are individually moved radially inwards to form a non-level support profile to support the shrink surface in the shrink position. The support profile can be highly configurable, depending on the number of profile segments. The support profiles can be symmetrical or asymmetrical, smooth or abrupt, with sharper or more acute angles, or a combination of the aforementioned characteristics. In particular, the highly configurable shrink sections can be used to support or accommodate tyre components other than reinforcement strips, for example sidewalls.

In an embodiment each shrink section is provided with one or more rings, wherein each ring is provided with a plurality of stopping surfaces for stopping the radially inward movement of the individual profile segments in accordance with their respective radial position within the non-level support profile. The profile segments can thus all have the same length in the radial direction and/or be substantially identical, while the support profile is defined by the rings.

In an embodiment the rings are removably received in the respective shrink sections. Thus, the rings can be easily replaced by other rings with different stepped stopping surfaces, thereby obtaining a different support profile.

In an embodiment the rings are integral to the shrink sections.

In an alternative embodiment each shrink section comprises a shrink chamber with a flat circumferential bottom for receiving the plurality of profile segments, wherein the plurality of profile segments comprises at least two profile segments with different lengths in the radial direction in accordance with their respective radial positions within the non-level support profile. Thus, no rings are required, as the support profile can be defined with the unequal radial height of the profile segments.

In a further alternative embodiment each shrink section is provided with a plurality of individually adjustable stopping elements for stopping the radially inward movement of the individual profile segments in accordance with their radial position within the non-level support profile. This embodiment provides an ever higher level of configurability, as the radial position of each of the plurality of profile segments can be set individually to change the support profile, without the need to replace the profile segments, rings or other components of the respective shrink section.

In an embodiment each of the plurality of profile segments comprises a radially extending slot, wherein each shrink section is provided with a radially movable actuator segment for moving the plurality of profile segments radially outwards to the level position, wherein the actuator segment is provided with a leveling shaft that extends through and engages with the slots of all of the plurality of profile segments of the respective shrink section to move all of the engaged profile segments to the level position. The plurality of profile segments can thus be directly moved to the level position by a single actuator segment.

In an embodiment the plurality of profile segments are provided with mutually meshing cams and recesses, wherein each shrink section is provided with a radially movable actuator segment for moving the plurality of profile segments radially outwards to the level position, wherein the actuator segment is provided with a leveling shaft that is arranged to engage with the cams and/or recesses of the profile segments that are directly adjacent to the actuator segment to said directly engaged profile segments to the level position, wherein the rest of the plurality of profile segments of the respective shrink section are arranged to be indirectly engaged by the meshing of the cams and recesses to move to the level position. The plurality of profile segments can thus be indirectly moved to the level position by a single actuator segment.

In an embodiment of the third aspect of the invention the actuator segment comprises a main body that acts as one of the plurality of profile segments, wherein the respective shrink section comprises an adjustable stopper for limiting the range of movement of the main body in the radially inward direction in accordance with the position of said main body within the support profile. The radial height of the main body of the actuator segment can thus be set to match or complement the support profile, so that the main body forms a part of said support profile.

In an the drum is provided with a first bead lock section and a second bead lock section for locking a first bead and a second bead, respectively, wherein the first shrink section and the second shrink section are arranged between the first bead lock section and the second bead lock section, respectively, in the axial direction. Preferably, the first shrink section and the second shrink section are arranged to be directly adjacent to the first bead lock section and the second bead lock section, respectively. The first reinforcement strip and the second reinforcement strip can thus be received at their respective shrink sections, axially inside the first bead and the second bead, respectively.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 1A-1F show a drum according to a first embodiment of the invention with shrink sections and a shaping section for manufacturing a run-flat tyre, and steps of a method for manufacturing a run-flat tyre with the use of said drum;

FIG. 2A shows a detail of one of the shrink sections according to the circle II A in FIG. 1A;

FIG. 2B shows a detail of one of the shrink sections according to the circle II B in FIG. 1B;

FIGS. 3A and 3B show the same details as in FIGS. 2A and 2B, yet with an alternative shrink section according to a second embodiment of the invention;

FIGS. 9A and 9B show the same drum as in FIGS. 1A and 1B, yet with an alternative order of the steps of the method;

FIGS. 10A and 10B show the same details as in FIGS. 2A and 2B, yet with a further highly configurable shrink section according to a fourth embodiment of the invention;

FIGS. 12A and 12B, FIGS. 13A and 13B and FIGS. 14A and 14B show further alternatives of the highly configurable shrink section according to FIGS. 10A and 10B, according to a fifth embodiment, a sixth embodiment and a seventh embodiment, respectively, of the invention.

DETAILED DESCRIPTION OF THE INVENTION

FIGS. 1A-1F show a drum 1, in particular an uni-stage or single-stage drum 1, for manufacturing tyres, in particular self-supporting tyres or run-flat tyres, according to a first embodiment of the invention.

Figure 1B:
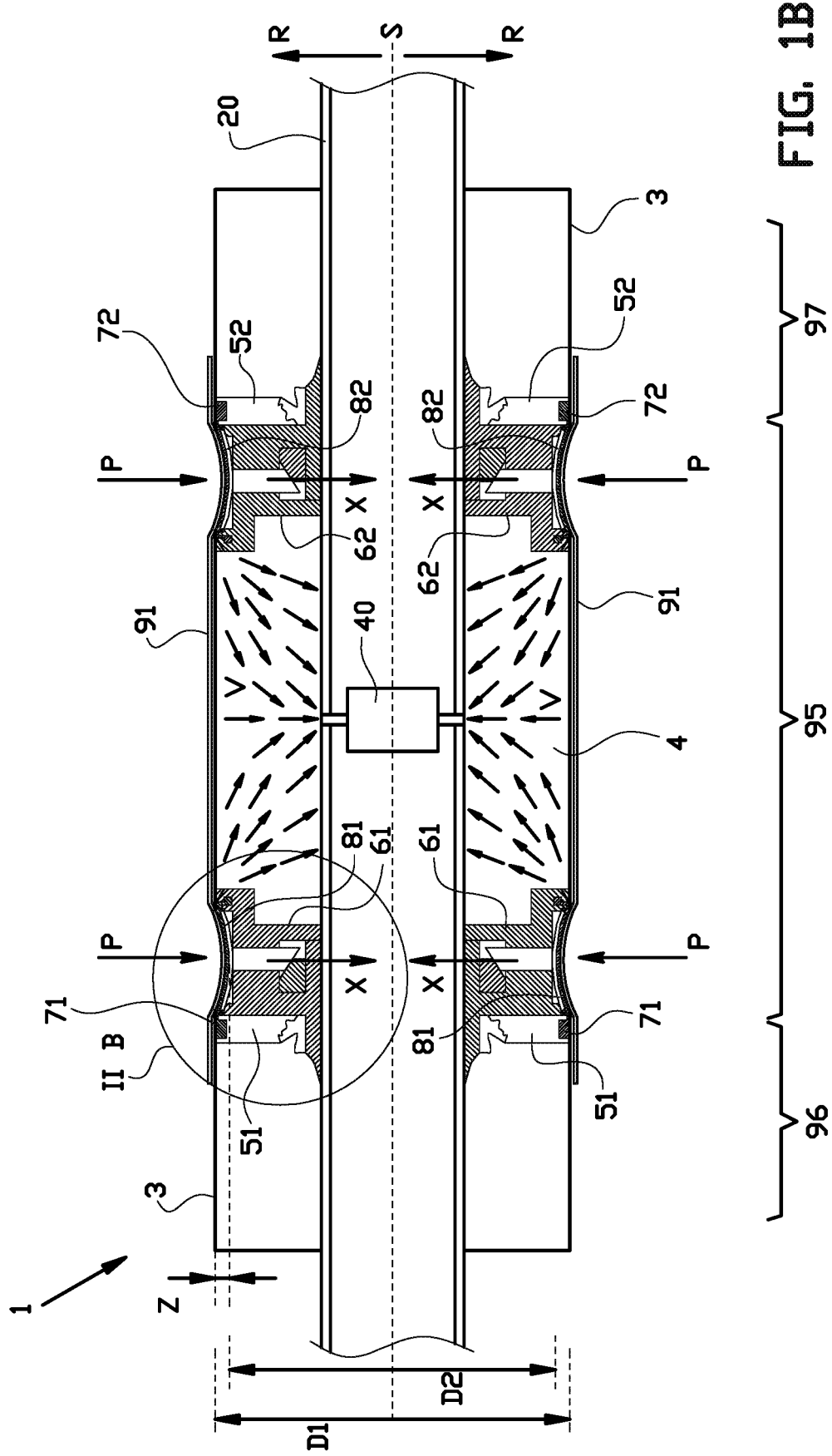
Figure 1D:
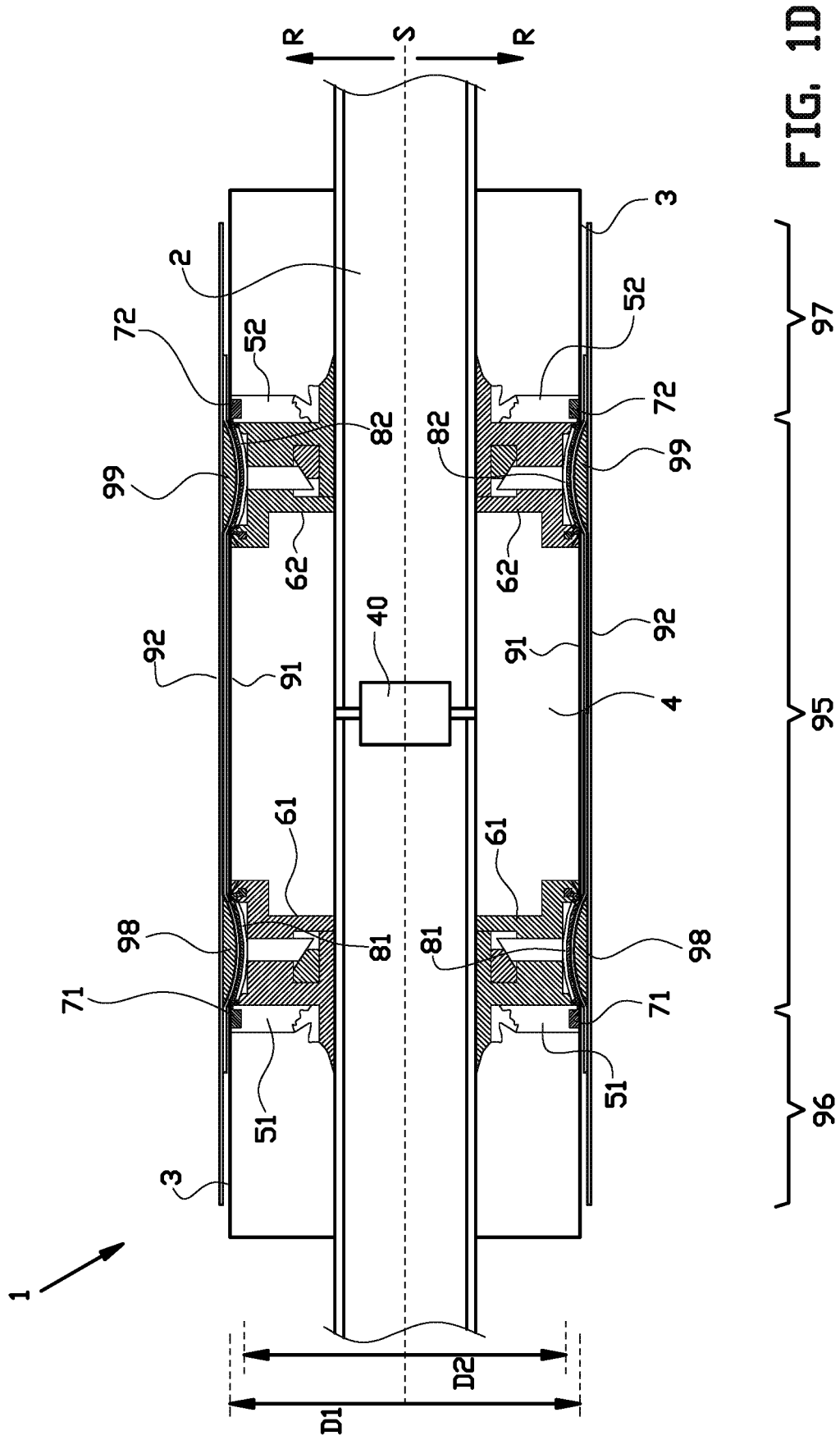
Figure 1E:
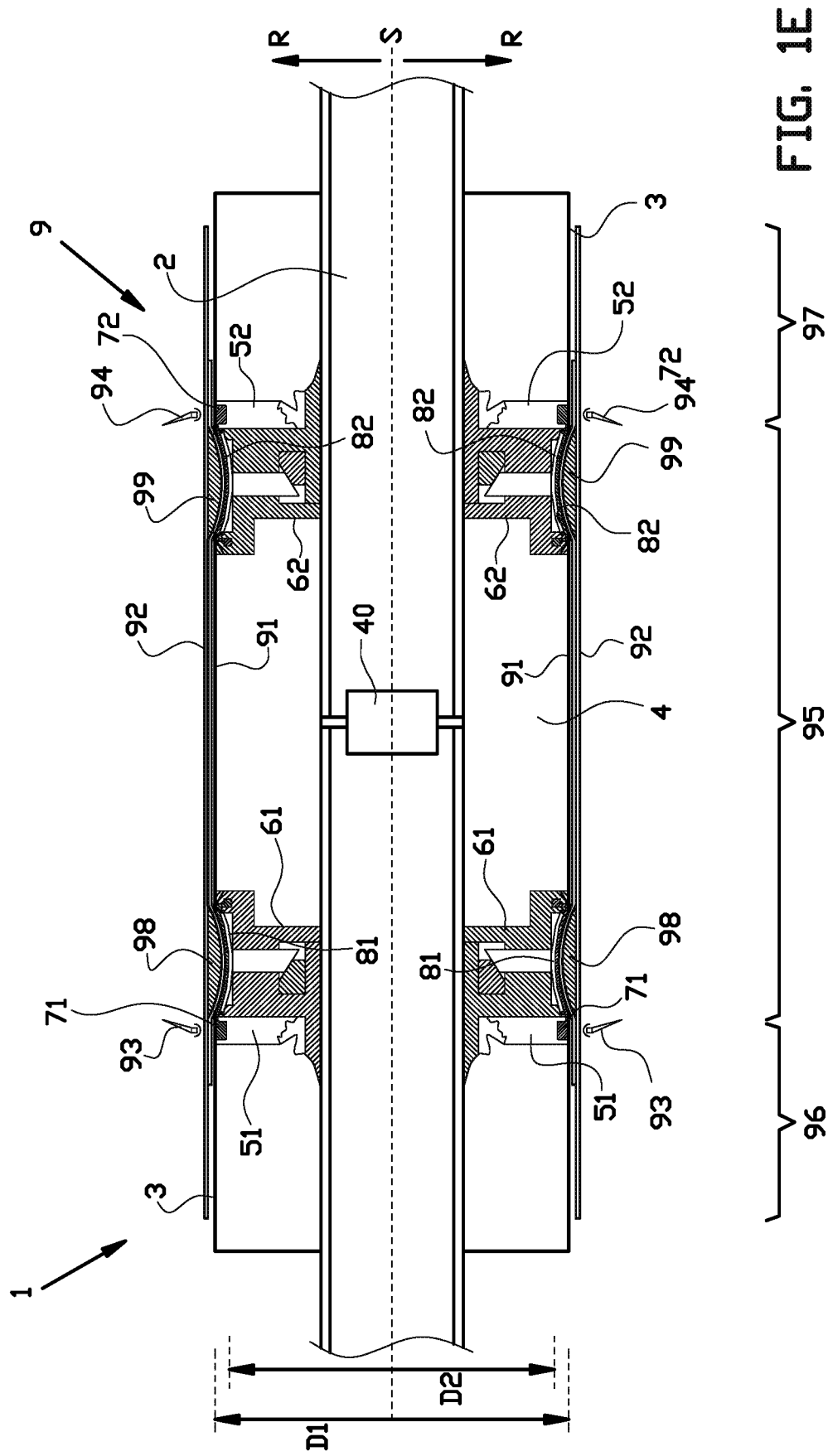

As shown in FIGS. 1E and 1F, the run-flat tyre according to the invention comprises a carcass 9 with a package of at least a first tyre layer in the form of an inner liner 91 and further tyre layers in the form of one or more body plies 92. Beads 93, 94 divide the package of the inner liner 91 and the one or more body plies 92 into an inner part 95 between the beads 93, 94 and two outer parts 96, 97 outside of the beads 93, 94. During shaping of the carcass 9, the inner part 95 is inflated into a torus-like shape, while the outer parts 96, 97 are doubled back onto the inner part 95 around the beads 93, 94. The run-flat tyre further comprises reinforcement strips 98, 99, in particular run-flat strips, interposed between the inner liner 91 and the one or more body plies 92 at the inner part 95, at or near the beads 93, 94. After shaping of the carcass 9, the reinforcement strips 98, 99 are located adjacent to the beads 93, 94 at the inner part 95 of the run-flat tyre, extending from the beads 93, 94 in the radial direction of the run-flat tyre to enhance the rigidity of the sidewalls of the run-flat tyre in said radial direction.

As shown in FIG. 1A, the drum 1 for the manufacture of the aforementioned run-flat tyre comprises a central drum shaft 2 that defines the central, rotational axis S and the axial direction A of the drum 1. The drum 1 further has a cylindrical, main circumferential surface 3 extending concentrically around the central axis S. The main circumferential surface 3 is formed by a plurality of drum segments, e.g. 24, not shown and known per se, which are movable in an outwardly directed, radial direction R with respect to the central axis S of the drum 1 to expand and contract the diameter of the main circumferential surface 3 of the drum 1 in said radial direction R. As shown in FIG. 1A, the main circumferential surface 3 is arranged for receiving and directly supporting the inner liner 91 for the run-flat tyre. In the situation as shown in FIG. 1A, the main circumferential surface 3 is arranged at a first circumference or diameter D1 that is slightly greater than the natural circumference of the inner liner 91, thereby causing the inner liner 91 to be slightly stretched around the main circumferential surface 3 of the drum 1. The stretch of the inner liner 91 is preferably less than 1% of its natural circumference.

The drum 1 further comprises a central shaping section 4 and an air pump device 40 that is operationally connected with the shaping section 4. The air pump device 40 is provided with one or more air pumps (not shown) for supplying air to the shaping section 4 to generate an overpressure W that inflates or shapes the carcass 9, as shown in FIG. 1F, and for removing or drawing air from the shaping section 4 to create an underpressure or partial vacuum V in the shaping section 4, as shown in FIG. 1B. Preferably, the partial vacuum V has an underpressure that is at least 0.1 Bar less than the ambient atmospheric pressure. In this exemplary embodiment, the air pump device 40 is arranged in or at the drum shaft 2. Alternatively, the air pump device 40 may also be provided outside the drum 1, while being operationally connected through suitable conduits to the shaping section 4.

The drum 1 is provided with two bead lock sections 51, 52 spaced apart in the axial direction A, one on each side of the shaping section 4, hence with the shaping section 4 in between. The bead lock sections 51, 52 are arranged for locking or clamping the first bead 93 and the second bead 94 for the run-flat tyre against the carcass 9 in a manner known per se. When the beads 93, 94 are locked against the carcass 9, the inner part 95 between the beads 93, 94 is sealed from the outer parts 96, 97 and may be inflated. As shown in FIG. 1F, the bead lock sections 51, 52 are movable towards each other and the shaping section 4 in the axial direction A of the drum 1 to facilitate the shaping or forming of the inner part 95 of the carcass 9 during said inflation. Ultimately, the two outer parts 96, 97 of the carcass 9 that are located in the axial direction A outside of the shaping section 4, beyond the respective beads 93, 94, are turned up (schematically indicated in FIG. 1F with arrows T) against the inflated, shaped inner part 95 by bladders or turn-up arms, not shown and known per se.

As shown in FIG. 1A, the drum 1 is further provided with a first shrink section 61 and a second shrink section 62, adjacent to the first bead lock section 51 and the second bead lock section 52, respectively, at the respective sides of the bead lock sections 51, 52 facing in the axial direction A towards the shaping section 4. Hence, the first shrink section 61 and the second shrink section 62 extend at the inner part 95 of the carcass 9. Preferably, the shrink sections 61, 62 are integral with or commonly supported on the drum shaft 2 with their respective bead lock sections 51, 52 so as to move in unison with their respective bead lock sections 51, 52 in the axial direction A of the drum 1 during shaping of the carcass 9.

As shown in FIG. 1A, the drum 1 comprises a first sleeve or sealing member 71 and a second sleeve or sealing member 72, respectively, extending circumferentially around the respective bead lock sections 51, 52 and shrink sections 61, 62 to provide a sealing between the bead sections 51, 52 and their respective shrink sections 61, 62. The sealing members 71, 72 are made of an elastic or flexible material. The circumference of the sealing members 71, 72 is smaller than the circumference of the bead lock sections 51, 52 and the shrink sections 61, 62. The sealing members 71, 72 are evenly stretched to the first diameter D1 when they are applied around the bead lock sections 51, 52 and the shrink sections 61, 62. As a result of the even stretching, the sealing members 71, 72 are pre-stressed or tightly applied around bead lock sections 51, 52 and the shrink sections 61, 62 and will tend to evenly contract or shrink towards their smaller, natural diameter when allowed to do so.

Figure 7:
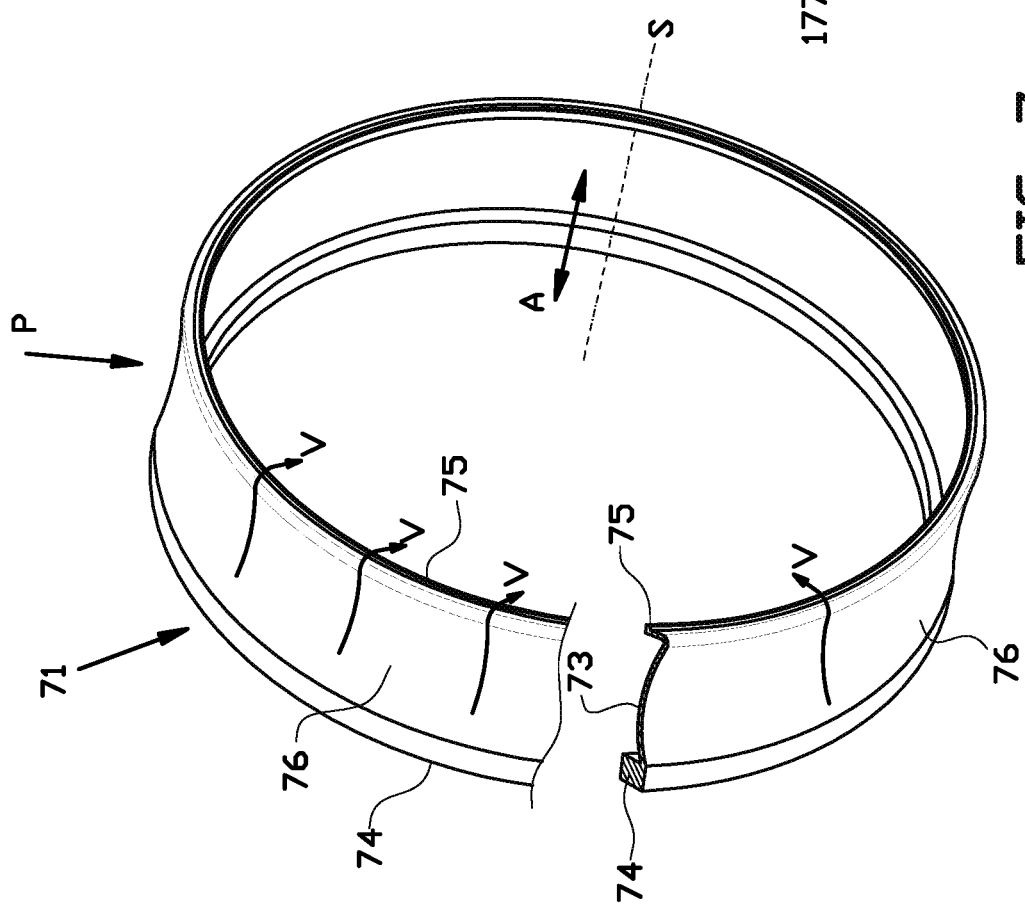
FIG. 7 shows a sealing member of one of the shrink sections according to FIG. 1A in isolation.

In FIG. 7, the first sealing member 71 is shown in more detail. The first sealing member 71 is mirror symmetrical to the second sealing member 72. Part of the circumference of the first sealing member 71 has been schematically hidden to reveal the cross section of the first sealing member 71. In reality, the first sealing member 71 is fully annular. The first sealing member 71 comprises an annular shrink surface 73 that, at one end in the axial direction A, is delimited by a first end 74, in this example in the form of a first profiled rim, for connection to the first bead lock section 51 and, at the opposite end in the axial direction A, is delimited by a second end 75, in this example in the form of a second profiled rim, for connection to the first shrink section 61. As shown in FIG. 1A, underneath the sealing members 71, 72, the first shrink section 61 and the second shrink section 62 are provided with a plurality of first support plates 81 and a plurality of second support plates 82, respectively, for supporting, shaping and/or guiding the respective sealing members 71, 72 during a transition from a level position, as shown in FIG. 1A, to a contracted or shrink position, as shown in FIG. 1B. In the shrink position, the sealing members 71, 72 are moved radially inwards with respect to the original position of the sealing members 71, 72 in the level position.

FIG. 2A shows the first bead lock section 51, which is mirror symmetrical to the second bead lock section 52, in more detail. The first bead lock section 51 comprises a plurality of clamping bodies 53 evenly distributed around the drum shaft 2 in the circumferential direction of the drum 1 to form a ring of clamping bodies 53. In FIG. 2A, only one of the clamping bodies 53 is shown. The clamping bodies 53 are movable in the radial direction R of the drum 1 to push the inner liner 91 and the one or more body plies 92 in the radial direction R of the drum 1 against the bead 93 to lock said bead 93 against the carcass 9. Each clamping body 53 is provided with a first attachment element 54, in this exemplary embodiment in the form of a profiled channel, for receiving the first end 73 of the first sealing member 71. Each clamping body 53 further comprises a first sealing portion 55 adjacent to the first attachment element 54 at the side of the first attachment element 54 facing away from the shaping section 4 in the axial direction A of the drum 1. The first sealing portion 55 is arranged for directly abutting or contacting the inner liner 91 adjacent to the first sealing member 71.

FIG. 2A further shows the first shrink section 61, which is mirror symmetrical to the second shrink section 62, in more detail. The first shrink section 61 comprises a plurality of shrink segments 63 evenly distributed around the drum shaft 2 in the circumferential direction of the drum 1 to form a ring of shrink segments 63. Only one shrink segment 63 is shown in FIG. 2A. The shrink segment 63 is mounted on the drum shaft 2 so as to be movable in the axial direction A of the drum 1. In this exemplary embodiment, the clamping bodies 53 of the first bead lock section 51 are supported on the shrink segments 63 so that the first bead lock section 51 and the first shrink section 61 can be moved in unison in the axial direction A of the drum 1. Each shrink segment 63 is provided with a second attachment element 64, in this exemplary embodiment in the form of a profiled channel, for receiving the second end 75 of the first sealing member 71.

Figure 6B:
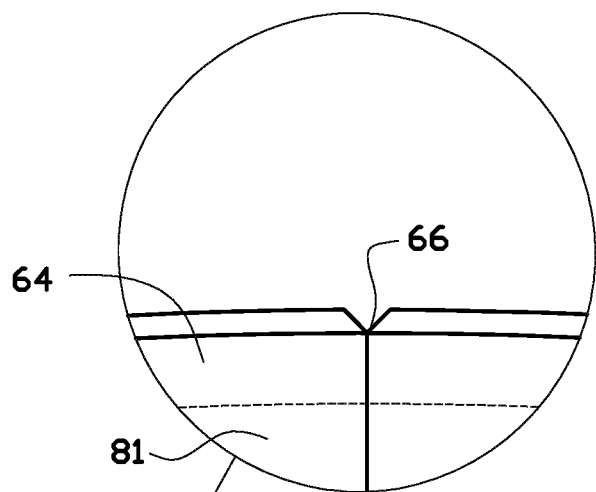
FIG. 6B shows a detail of the cross section of the drum according to the circle VI B in FIG. 6A.
Figure 6A:
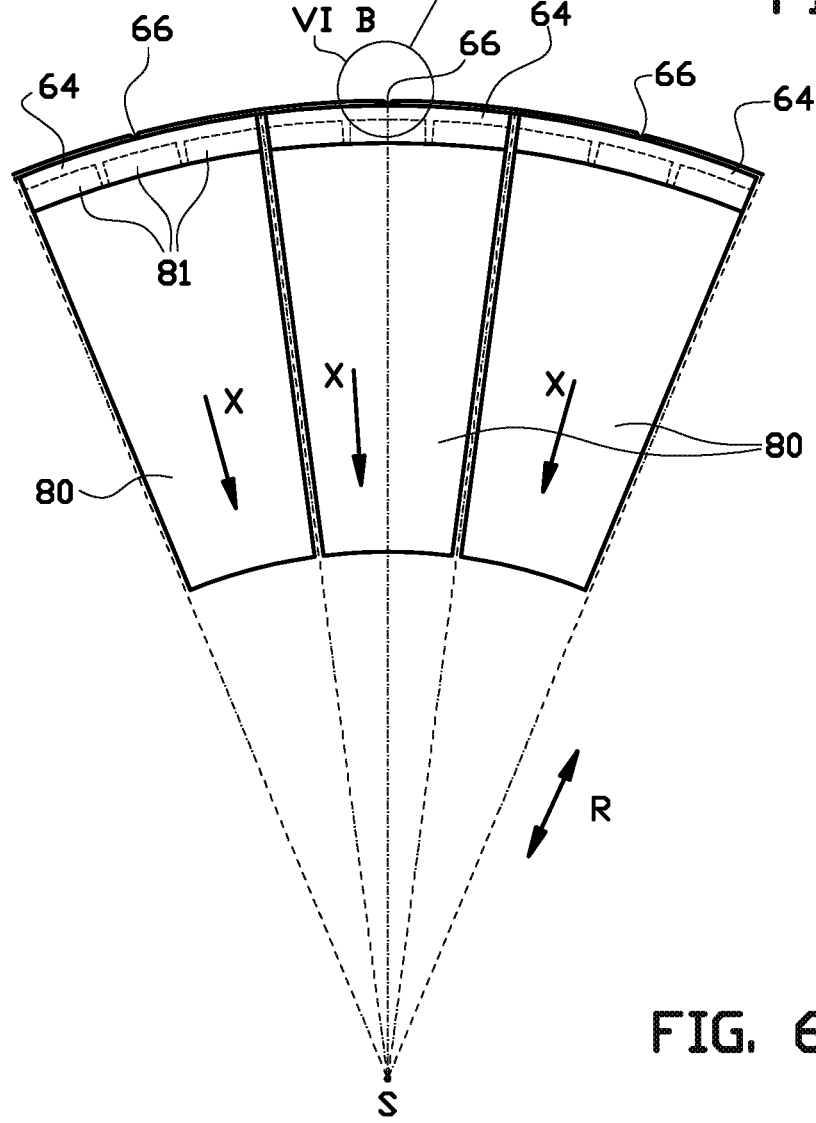
FIG. 6A shows a partial cross section of the drum according to the line VI A-VI A in FIG. 1A.

Each shrink segment 63 further comprises a second sealing portion 65 adjacent to the second attachment element 64 at the side of the second attachment element 64 facing towards the shaping section 4 in the axial direction A of the drum 1. The second sealing portion 65 is arranged for directly abutting or contacting the inner liner 91 adjacent to the first sealing member 71. As shown in FIGS. 2B and 6A, in or at the second sealing portion 65, each shrink segment 63 is provided with a fluid connection 66, in this exemplary embodiment in the form of a groove, for allowing fluid communication, in particular air communication, between both sides of the second sealing portion 65 in the axial direction A, through or along the second sealing portion 65. The fluid connection 66 connects the shaping section 4 to the side of the second sealing portion 65 axially opposite to the shaping section 4.

Figure 4:
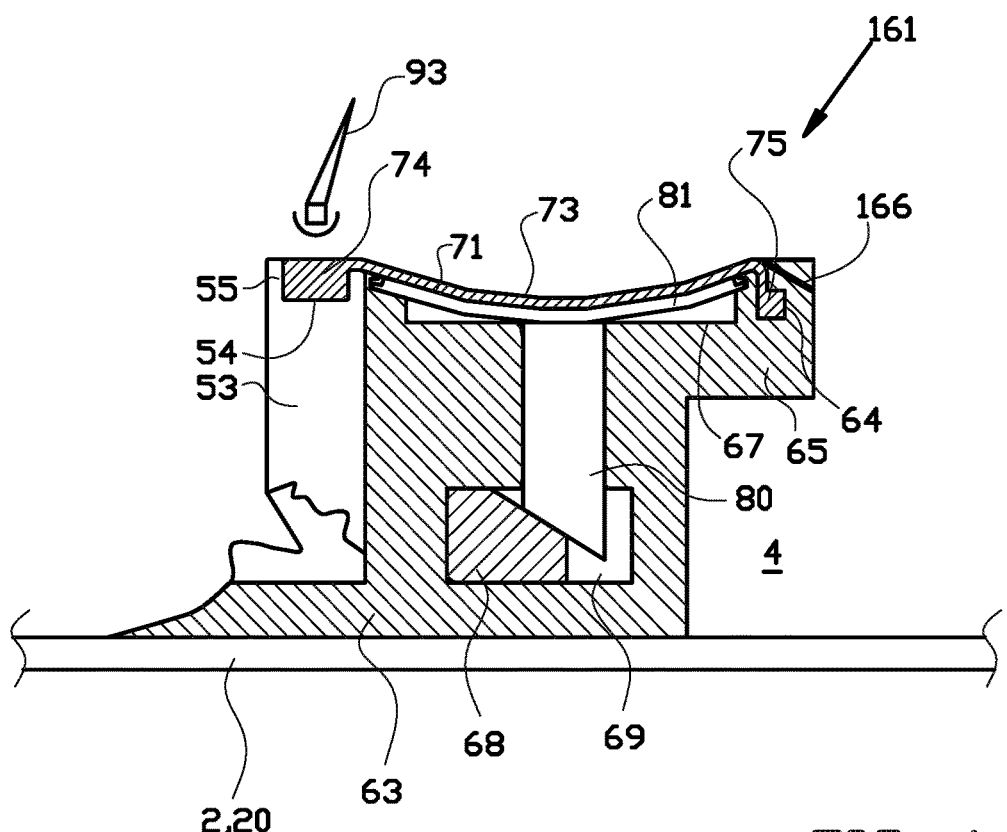
FIG. 4 shows the same detail as in FIG. 2B, yet with a further alternative shrink section according to a third embodiment of the invention.

As shown in FIG. 4, the fluid connection 66 may alternatively be provided as a duct 166, integral to the second sealing portion 65. In this exemplary embodiment, the integral duct 166 originates from the shaping section 4 and debouches directly adjacent to the shrink surface 73 of the first sealing member 71. Alternatively, the integral duct 166 may originate from another source location of the air pump device 40, e.g. directly from the drum shaft 20.

Each shrink segment 63 is provided with a shrink chamber 67 that allows for the shrinking of the first shrink section 61 from the level position, as shown in FIG. 2A, to the shrink position, as shown in FIG. 2B. The shrink chamber 67 is provided with cams or lugs 87, 88 for engaging or holding the ends of the first support plate 81 in the shrink chamber 67.

The support plates 81, 82 are preferably made of a resilient material which has been given a natural, unstressed shape. The unstressed shape of the support plates 81, 82 substantially corresponds to the (negative) profile of the reinforcement strips 98, 99. In the shrink position, as shown in FIG. 2B, the support plates 81, 82 are allowed to return to their natural, unstressed shape. The support plates 81, 82 are mounted in the shrink chamber 67 so as to be resiliently flexible between a flexed state in the level position, as shown in FIG. 2A, and a natural state in the shrink position, as shown in FIG. 2B. In particular the ends 85, 86 of the support plates 81, 82 in the axial direction A are engaged by or held by the cams or lugs 87, 88 of the shrink chamber 67, such that the ends 85, 86 are fixed against movement in the radial direction R relative to the shrink section 63. Meanwhile, the body of the support plates 81, 82 in between the ends 85, 86 is resiliently flexible in the radial direction R over a shrink distance Z, parallel to the radial direction R of the drum 1.

The flexing of the support plates 81, 82 in the radial direction R is driven by a plurality of actuator segments 80, evenly distributed in the circumferential direction of the drum 1. The actuator segment 80 is actuated by a drive to move in a radially inward direction X, parallel to the radial direction R. In this example the drive is a pneumatic drive formed by a wedge 68 that is pneumatically driven to move back and forth through a pneumatic chamber or cylinder 69 in a wedge direction Y, parallel to the axial direction A of the drum 1. The stroke of the wedge 68 through the pneumatic cylinder 69 may be adjusted and/or limited by suitable limiting means, e.g. by adding a shaft (not shown) to the wedge 68 that extends in the wedge direction Y out of the pneumatic cylinder 69, wherein, at the outside of the pneumatic cylinder 69, the shaft is provided with an adjustable stopper, e.g. a nut. Alternatively, spacing elements (not shown) may be provided inside the pneumatic cylinder 69 to limit the range of said pneumatic cylinder 69. The actuator segments 80 are actively forced upwards in the radially outward direction R to actively flex the support plate 81 to the flexed state in the level position, while retracting the wedge 68 allows the actuator segment 80 to move in a return movement X under the bias of the first support plate 81 towards its natural state or shape in the shrink position.

As shown in FIG. 2B, the first support plate 81 has a curvature with a substantially constant radius. The first support plate 81 is uniformly curved or bend in its natural state. The first support plate 81 has a substantially uniform stiffness or flexibility across its length between the opposite ends 85, 86 and resiliently flexes back into the shrink position, as shown in FIG. 2B, after being flexed into the flexed state in the level position as shown in FIG. 2A. In an alternative embodiment of the invention, as shown in FIGS. 3A and 3B, an alternative first support plate 181 is provided that is weakened at certain positions along its lengths between the opposite ends 85, 86. In this example, the alternative first support plate 181 is weakened at two positions by providing fold lines K, L, thereby imposing more abrupt transitions in the curvature or radii of the alternative first support plate 181 during its flexing back into the shrink position, as shown in FIG. 3B. With the strategically chosen fold lines K, L alternative cross sectional shapes of the reinforcement strips 98, 99 can be accommodated, e.g. asymmetrical, truncated or multi-planar.

FIGS. 10A and 10B show an alternative, highly configurable shrink section 261 according to a fourth embodiment of the invention.

The alternative shrink section 261 replaces the shrink section 61 as shown in FIGS. 2A and 2B. The alternative shrink section 261 cooperates with the bead-lock section 51 in the same manner as the shrink section 61 as shown in FIGS. 2A and 2B.

The alternative shrink section 261 differs from the aforementioned shrink section 61 in that it does not comprises a support plate underneath the sealing member 71 that defines the shape of shrink surface 73 of the sealing member 71 when the sealing member 71 is contracted from the level position as shown in FIG. 10A to the shrink position as shown in FIG. 10B.

Figure 11:
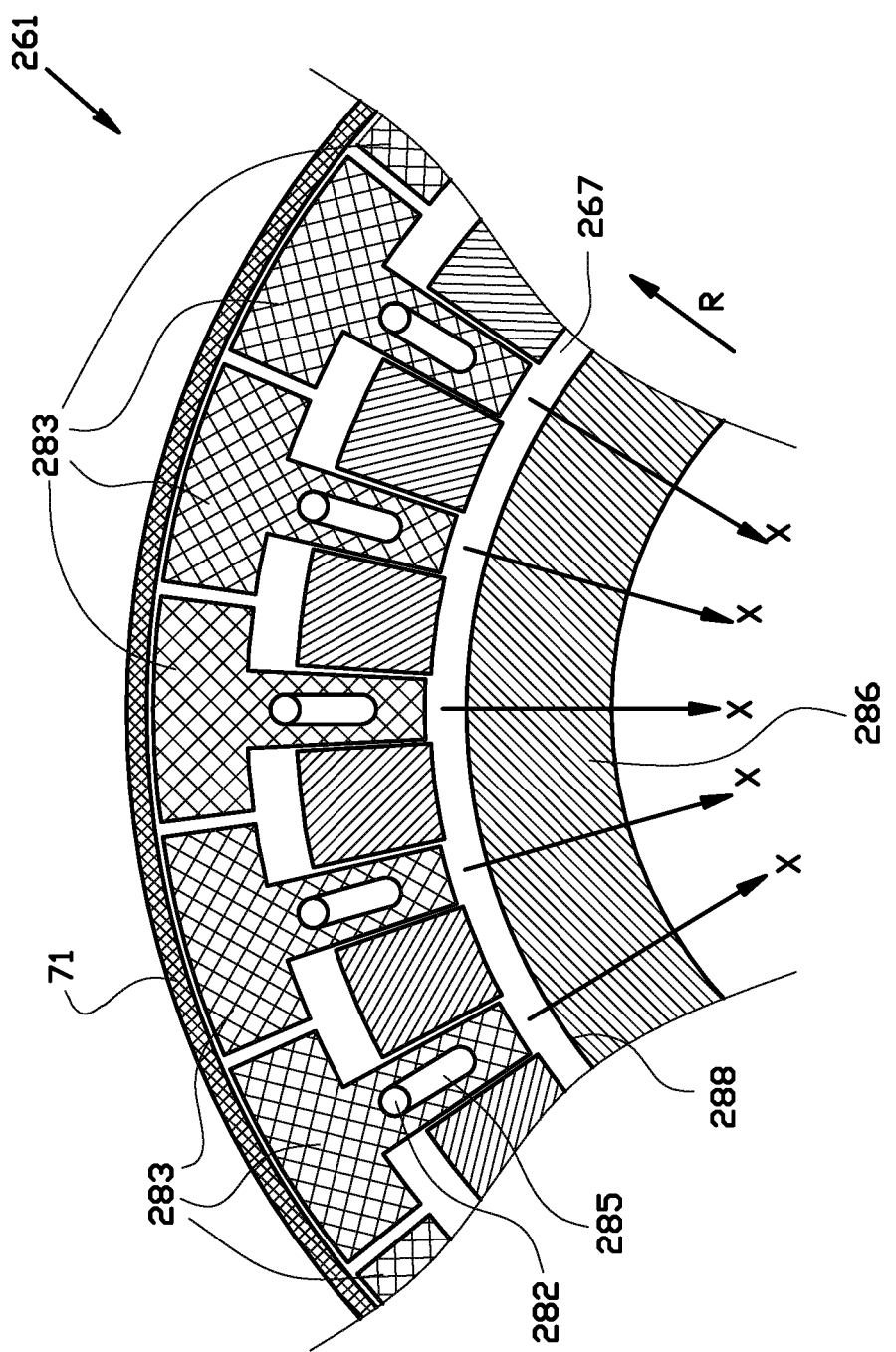
FIG. 11 shows a side view of the configurable parts of the shrink section according to FIGS. 10A and 10B.

Instead, as shown in FIG. 10A, the alternative shrink section 261 is provided with a shrink chamber 267 and a plurality of radially adjustable profile segments 283, 284 received in said shrink chamber 267. The plurality of profile segments 283, 284 are placed adjacent to each other in the axial direction A of the drum shaft 2 and are arranged to be individually retracted or to move inwards within the shrink chamber 267 in the radially inward direction X towards individual retracted positions, as shown in FIG. 10B. In their respective retracted positions, the plurality of profile segments 283, 284 form a highly configurable, non-level support profile for supporting the shrink surface 73 of the sealing member 71 in the shrink position as shown in FIG. 10B. Like the support plates 81, the plurality of profile segments 283, 284 are distributed in the circumferential direction of the drum as shown in FIG. 11.

To set or configure the respective retracted positions of the plurality of profile segments 283, 284, the shrink section 261 is provided with one or more profile rings 286, 287, extending on the radial inside of the plurality of profile segments 283, 284. Each profile ring 286, 287 is provided with stepped stopping surfaces 288, 289, wherein each of the stopping surface 288, 289 is arranged directly opposite to one of the plurality of profile segments 283, 284 in the radially inward direction X for stopping said respective profile segment 283, 284 in a retracted position specific to said respective profile segment 283, 284 within the support profile. Each retracted radial position is thus defined by the abutment of the profile segments 283, 284 with profile rings 286, 287. The profile rings 286, 287 can be replaced by other profile rings 286, 287 with different stepped stopping surfaces 288, 289 corresponding to a different support profile.

As shown in FIGS. 10A and 10B, the profile segments 283, 284 are arranged in two groups on opposite sides of an alternative actuator segment 280 in the axial direction A of the drum shaft 2. The actuator segment 280 is forced radially outwards in the radially outward direction R by a wedge 268 much like the wedge 68 in FIGS. 2A and 2B. When the wedge 268 is partly moved away from under the actuator segment 280, the actuator segment 280 is allowed to move inwards in the radially inwards direction X. The actuator segment 280 is provided with a main body 281 extending in the radial direction R parallel to the profile segments 283, 284 and essentially functioning like a profile segment, and a leveling shaft 282 protruding from both sides of the main body 281 parallel to the axial direction A of the drum shaft 2 towards the two groups of profile segments 283, 284. As shown in FIGS. 10A, 10B and 11, each of the profile segments 283, 284 is provided a slot 285 for receiving the leveling shaft 282. The slot 285 is long enough in the radial direction R to allow the respective profile segment 283, 284 to move from the level position as shown in FIG. 10A to the retracted position as shown in FIG. 10B. The height of the profile segments 283, 284 above the respective slots 285 is the same for all profile segments 283, 284 and is furthermore equal to the height of the main body 281 of the actuator segment 280 above the leveling shaft 282.

The radial height or distance of the actuator segment 280 with respect to the drum shaft 2 is limited in the retracted position of FIG. 10B by providing an adjustable stopper, e.g. a nut 600, in the pneumatic cylinder 269, thereby adjustably limiting the range of the wedge 268 within said pneumatic cylinder 269, and thus the range of movement of the main body 281 of the actuator segment 280 in the radially inward direction X. The retracted position of the actuator segment 280 is set to match the support profile at the axial position of the actuator segment 280.

The actuator segment 280 is arranged to be forced radially outwards in the radial direction R when the wedge 268 is moved underneath the actuator segment 280. As the actuator segment 280 moves radially outward, the leveling shaft 282 moves through the respective slots 285 of the profile segments 283, 284 and ultimately contacts all of the profile segments 283, 284 simultaneously, thereby lifting the profile segments 283, 284 to a single, mutually level radial height or position, that is furthermore level with the top of the actuator segment 280. Hence, the profile segments 283, 284, together with the actuator segment 280, now form a substantially level profile for supporting the shrink surface 73 of the sealing member 71 in the level position as shown in FIG. 10A.

When the actuator segment 280 is allowed to return inwards in the radially inward direction X, the leveling shaft 282 moves inwards into the radially inward direction X. The profile segments 283, 284 are allowed to move down together with the leveling shaft 282, until the profile segments 283, 284 individually come into abutment with their respective stopping surfaces 288, 289 at the profile rings 286, 287. In their respective retracted positions, the profile segments 283, 284 extend up to or are at an unequal radial height or distance with respect to the drum shaft 2. In particular, the radial distances of the profile segments 283, 284, when resting on the stopping surfaces 288, 289, corresponds to the desired support profile to be formed by said profile segments 283, 284.

FIGS. 12A and 12B, FIGS. 13A and 13B and FIGS. 14A and 14B show further embodiments of highly configurable shrink sections 361, 461, 561 according to a fifth embodiment, a sixth embodiment and a seventh embodiment, respectively, of the invention.

As shown in FIGS. 12A and 12B, the highly configurable shrink section 361 according to the fifth embodiment differs from the one as shown in FIGS. 10A and 10B in that the profile rings are absent. Instead, the bottom 388, 389 of the shrink chamber 367 is flat or substantially flat in the axial direction A of the drum shaft 2 and the profile segments 383, 384 have been given individual lengths in the radial direction R. As a result, when two profile segments 383, 384 with different lengths come into abutment with the flat bottom 388, 389 of the shrink chamber 367, the profile segments 383, 384 with different lengths extend radially outwards in the radially outward direction R over different lengths corresponding to the radial height of said profile segments 383, 384 within the support profile. In this embodiment, changing the support profile involves replacing one or more of the profile segments 383, 384 with profile segments of a different length. In this embodiment, the profile segments 383, 384 closest to the actuator segment 380 are actuated directly by the leveling shaft 382. However, the leveling shaft 382 does not extend through slots in all of the adjacent profile segments 383, 384. Instead, the adjacently situated profile segments 383, 384 are actuated indirectly by their neighboring profile segments 383, 384 by mutually meshing cams and recesses 385.

As shown in FIGS. 13A and 13B, the highly configurable shrink section 461 according to the sixth embodiment differs from the one as shown in FIGS. 10A and 10B in that the profile rings are integrated into the shrink segment 263 of the shrink section 461. Thus, the stepped stopping surfaces 488, 489 are provided directly at the bottom of the shrink chamber 467. Again, the profile segments 483, 484 are actuated indirectly through meshing cams and recesses 485.

As shown in FIGS. 14A and 14B, the highly configurable shrink section 561 according to the seventh embodiment differs from the one as shown in FIGS. 10A and 10B in that the stepped stopping surfaces of the profile rings are replaced or formed by individually adjustable stopping elements 588, 589, for example in the form of height adjustable screw or bolts. As each of the stopping elements 588, 589 can be individually set to the correct radial height, this embodiment is highly configurable without needing to replace parts such as profile rings or profile segments 583, 584. Again, the profile segments 583, 584 are actuated indirectly through meshing cams and recesses 585.

Alternatively, the profile segments 383, 384; 483, 484; 583, 584 as shown in FIGS. 12A and 12B, FIGS. 13A and 13B, and FIGS. 14A and 14B may be provided with the same slots as shown in FIGS. 10A, 10B and 11, to be moved by the actuator 260 as shown in FIGS. 10A, 10B and 11.

The aforementioned, highly configurable shrink sections 261, 361, 461, 561 may be used for supporting the sealing member 71 in the shrink section on top of various highly adjustable support profiles. The support profiles can be symmetrical or asymmetrical, smooth or abrupt, with sharper or more acute angles, or a combination of the aforementioned characteristics. In particular, the highly configurable shrink sections 261, 361, 461, 561 can be used to support the sealing member 71 according to a support profile that allows for accommodation of tyre components other than reinforcement strips, for example the sidewalls 601, 602 as shown in FIG. 15.

Figure 5A:
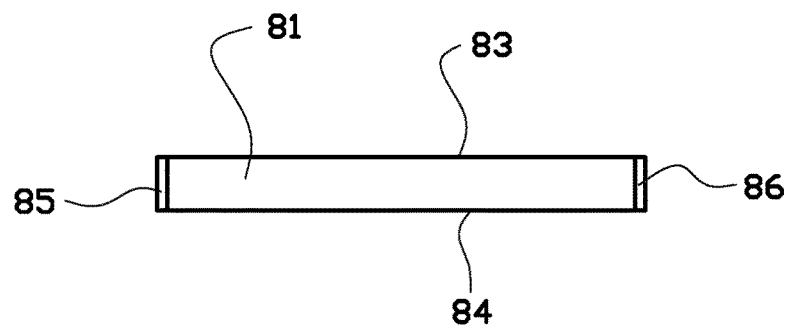
FIGS. 5A and 5B show two embodiments of a detail of the shrink section according to FIGS. 2A and 2B.
Figure 5B:
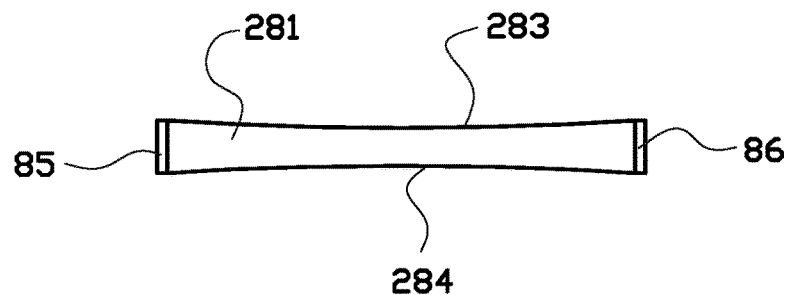

As shown in cross section in FIG. 6A, each actuator segment 80 is shaped as a circular segment and supports a plurality of first support plates 81. As shown in FIG. 5A, the first support plates 81 have straight or linear longitudinal sides 83, 84. Therefore, in the situation as shown in FIG. 6A, the first support plates 81 are slightly spaced apart in the circumferential direction of the drum 1, allow for the shrinking of the first support plates 81 to a smaller circumference at the first shrink section 61 and to prevent interference between the first support plates 81 during said shrinking. Instead, alternative first support plates 281 may be provided, as shown in FIG. 5B, which are provided with concave longitudinal sides 283, 284. The concave longitudinal sides 283, 284 define an hourglass shape, the center of which is adapted to the smaller diameter of the alternative first support plates 281 in the shrink position. Hence, the alternative first support plates 281 may be placed closer together so that, in the shrink position, the alternative first support plates 281 abut at their concave longitudinal sides 283, 284 and form a substantially or effectively closed circumferential surface.

With reference to FIGS. 1A-1F, the method for manufacturing the run-flat tyre with the aforementioned drum 1 will now be described in more detail. Although the following description only refers to the shrink sections 61, 62 according to FIGS. 1-9, the steps of the method also apply to the alternative shrink sections 261, 361, 461, 561 as shown in FIGS. 10A and 10B, FIGS. 12A and 12B, FIGS. 13A and 13B, and FIGS. 14A and 14B, respectively.

As shown in FIG. 1A, the support plates 81, 82 have been actively moved into the level position, for providing a level circumferential surface for receiving the inner liner 91. In FIG. 1A, the inner liner 91 is applied around the main circumferential surface 3 of the drum 1 and subsequently spliced. The drum segments (not shown) of the drum 1 have been slightly expanded to the first diameter D1 which is slightly larger than the original diameter of the spliced inner liner 91. As a result, the spliced inner liner 91 is slightly stretched, e.g. in the range of 0.5% to 1% of its diameter. The inner liner 91 extends across the bead lock sections 51, 52, the shrink sections 61, 62 and the shaping section 4. The support plates 81, 82 are actively flexed by their respective actuators into the level position, in which the shrink surfaces 73 supported on said support plates 81, 82 are level with the main circumferential surface 3 of the drum 1 at the first diameter D1. The first sealing portion 55 and the second sealing portion 65 of the respective bead lock sections 51, 52 and the respective shrink sections 61, 62 tightly abut the inner liner 91 at both axial ends 74, 75 of the sealing members 71, 72.

FIG. 1B shows the situation in which the vacuum pump (not shown) of the air pump device 40 has been activated to draw air from the shaping section 4. A partial vacuum V is created in the shaping section 4. As shown in FIGS. 2A and 2B, the wedge 68 is pneumatically retracted to allow the actuator segment 80 to move radially inwards in the radially inward direction X. As the support plates 81, 82 are allowed to move into their natural shape (or as the profile segments 283, 284; 383, 384; 483, 484; 583, 584 are retracted to their respective retracted positions), the shrink surfaces 73 of the respective sealing members 71, 72 follow the support plates 81, 82 (or the support profile formed by the profile segments 283, 284; 383, 384; 483, 484; 583, 584) in the radially inward direction X under the influence of the elastic tension in the sealing members 71, 72. As the inner liner 91 is slightly stretched, it will at least partially follow the shrink surfaces 73. When the inner liner 91 ultimately starts to separate from the shrink surfaces 73, air will enter in the intermediate space. However, as shown in FIG. 2B, the partial vacuum V also draws air from the area between the respective shrink surfaces 73 and the inner liner 91 through the fluid connection 66. Thus, any air in between is quickly, immediately or instantly draw out of the intermediate space between the inner liner 91 and the respective shrink surfaces 73. The sealing portions 55, 65 on both sides 74, 75 of the shrink surfaces 73 prevent air from reentering the area. Hence, the inner liner 91 is pulled or sucked under the influence of the underpressure or partial vacuum V onto the shrink surfaces 73.

As the shrink surfaces 73 follow the support plates 81, 82 (or the support profile formed by the profile segments 283, 284; 383, 384; 483, 484; 583, 584), the circumference of the drum 1 is locally reduced or decreased by the shrink distance Z to a second circumference or diameter D2, smaller than the first circumference or diameter D1, in preparation for receiving the reinforcement strips 98, 99. The support plates 81, 82 (or the support profile formed by the profile segments 283, 284; 383, 384; 483, 484; 583, 584) and the shrink surfaces 73 supported thereon are now closer to the central axis S of the drum 1 when compared to the situation in FIG. 1A, while the first diameter D1 of the main circumferential surface 3 of the drum 1 has remained the same. The inner liner 91 is sucked by the partial vacuum onto the shrink surfaces 73 and has been actively shrunk, preferably beyond its natural circumference into the shrink position at the second diameter D2 as shown in FIG. 2B. The shrink distance Z of the support plates 81, 82 (or the shrink distance Z of the support profile formed by the profile segments 283, 284; 383, 384; 483, 484; 583, 584) is related to the thickness of the reinforcement strips 98, 99 in the radial direction R of the drum 1, such that the reinforcement strips 98, 99 may be accommodated in circumferential indentations, cavities, grooves or recesses in the inner liner 91 substantially within the first diameter D1 of the main circumferential surface 3 of the drum 1. The reinforcement strips 98, 99 are either fully accommodated in the indentations or protrude slightly above remainder of the inner liner 91 outside the indentations. When protruding above the inner liner 91 outside the indentations, the reinforcement strips 98, 99 can be securely pressed into the indentation by an external pressure means, e.g. a pressure wheel or stitching wheel.

Figure 8:
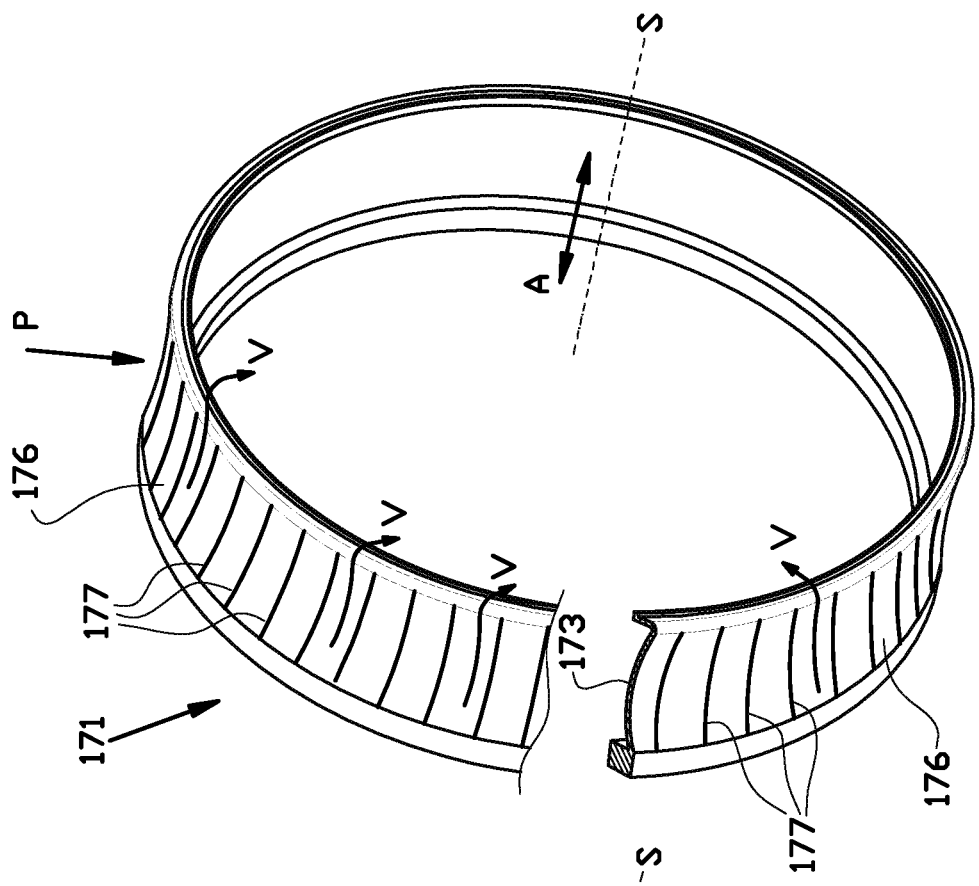
FIG. 8 shows an alternative sealing member to the sealing member as shown in FIG. 7.

The interaction between the inner liner 91 and the shrink surfaces 73 during the aforementioned shrinking should be enough to allow for air to be drawn from between the inner liner 91 and the shrink surfaces 73. However, to further enhance or improve the drawing of a partial vacuum between the inner liner 91 and the shrink surfaces 73, an alternative sealing member 171, as shown in FIG. 8, may be provided, which is provided with an alternative shrink surface 173. The alternative shrink surface 173 is provided with a plurality of venting elements 176, in particular in the form of protrusions, such as ribs or ridges, or depressions such as grooves, on the radially outward facing side of the alternative shrink surface 173. The venting elements 176 ensure that the alternative shrink surface 173 and the inner liner 91 are sufficiently spaced apart to allow air to be drawn from venting spaces between the inner liner 91 and the alternative shrink surface 173.

In FIG. 1C, the situation is shown in which the reinforcement strips 98, 99 have been placed in the indentations or recesses that were created in the inner liner 91 at the respective axial positions of the respective shrink sections 61, 62. It is noted that the radially outer surfaces of the reinforcement strips 98, 99 are substantially flush with the inner liner 91 outside of the shrink sections 61, 62.

FIG. 1D shows how the one or more body plies 92 are placed circumferentially around the inner liner 91 and the reinforcement strips 98, 99 at the shrink sections 61, 62 to form the carcass 9. In particular, it can be observed that the one or more body plies 92 can be arranged in a substantially flat or level state, despite the presence of the reinforcement strips 98, 99 at the shrink sections 61, 62. Thus, variations in the circumference, leading to inaccurate splicing of the one or more body plies, can be prevented.

FIG. 1E further shows the placement of the annular beads 93, 94 circumferentially around one or more body plies 92 at the respective axial positions of the respective bead lock sections 51, 52.

FIG. 1F shows the subsequent step of shaping the carcass 9. The bead lock sections 51, 52 have been slightly expanded in the radial direction R with respect to the main diameter D1 to force the one or more body plies 92 against the beads 93, 94. The beads 93, 94 now seal the inner part 95 of the carcass 9 from the outer parts 96, 97, such that the inner part 95 may be inflated. The air pump device 40 is now operated to generate an overpressure W in the shaping section 4 to inflate the inner part 95. Subsequently, the outer parts 96, 97 of the carcass 9 may be turned up T against the shaped inner part 95.

Figure 9B:
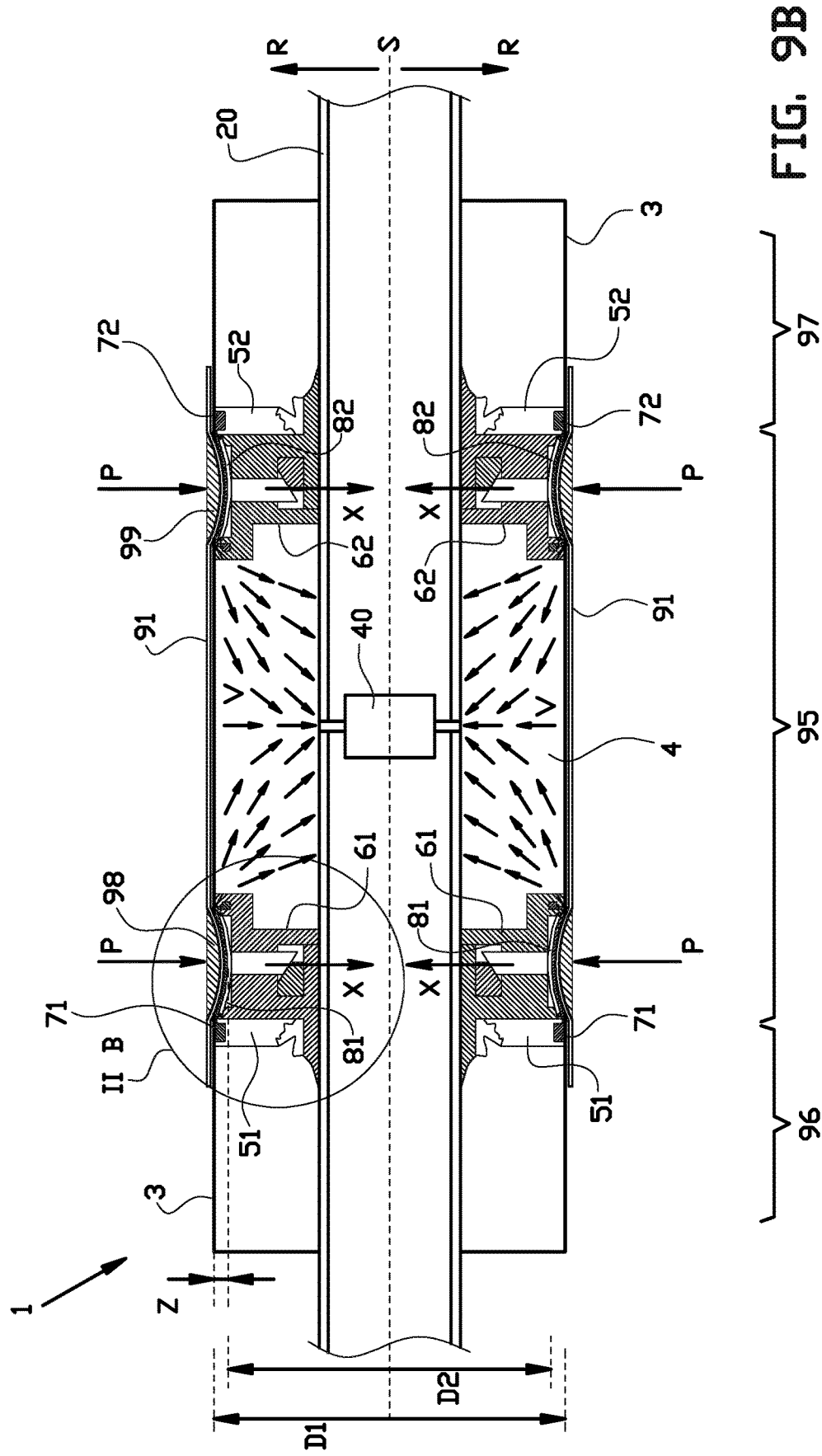

FIGS. 9A and 9B show the aforementioned drum 1, yet with an alternative order of the steps with respect to FIGS. 1A and 1B. In FIGS. 1A and 1B the shrink surfaces 73 are moved to the shrink position prior to the arranging of the first reinforcement strip 98 and the second reinforcement strip 99 around the inner liner 91 at the shrink surfaces 73 (see FIG. 1C). In the alternative method steps according to FIGS. 9A and 9B, the first reinforcement strip 98 and the second reinforcement strip 99 are arranged around the inner liner 91 at the shrink surfaces 73 prior to the shrink surfaces 73 moving to the shrink position. This alternative ordering of the steps may reduce the amount of air pockets being formed between the reinforcement strips 98, 99 and the inner liner 91. In particular, it can be observed that the reinforcement strips 98, 99 are placed on the inner liner 91 when the inner liner 91 is still substantially flat. The inner liner 91 is subsequently drawn onto the shrink surfaces 73 to the shrink position, while the reinforcement strips 98, 99 move together with the inner liner 91 to the shrink position.

As the carcass 9 is both built up and shaped on the same drum 1, the drum 1 according to the invention is considered to be a single stage or uni-stage drum 1.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a method for manufacturing a run-flat tyre, comprising the step of providing a drum with a first shrink section and a second shrink section, wherein each shrink section is provided with a shrink surface that is radially movable, further comprising the step of moving the shrink surfaces radially inwards with respect to the central axis from a level position to a shrink position in which the drum, at the shrink surfaces, has a circumference with a second diameter that is smaller than the first diameter, while creating a partial vacuum between the shrink surfaces and an inner liner at the first shrink section and the second shrink section; and shrinking the inner liner onto the shrink surfaces in the shrink position under the influence of the partial vacuum. The invention also relates to a drum for use in the aforementioned method.

The invention claimed is:

1. A method for manufacturing a tyre, the method comprising the steps of:
   providing a drum with a central axis and a main circumferential surface extending concentrically around said central axis at a first diameter,
      wherein the drum comprises a first shrink section and a second shrink section at spaced apart positions in the axial direction of the drum,
      wherein each of the first shrink section and the second shrink section is provided with a shrink surface that is radially movable;
   moving the shrink surfaces of the first shrink section and the second shrink section with respect to the central axis to a level position in which the shrink surfaces are at the first diameter and subsequently arranging a first tyre layer around the main circumferential surface of the drum and extending over the shrink surfaces at the first shrink section and the second shrink section;
   moving the shrink surfaces radially inwards with respect to the main circumferential surface and with respect to the central axis from the level position to a shrink position in which the drum, at the shrink surfaces, has a circumference with a second diameter that is smaller than the first diameter, while creating a partial vacuum between the shrink surfaces and the first tyre layer at the first shrink section and the second shrink section; and
   shrinking the first tyre layer onto the shrink surfaces in the shrink position under the influence of the partial vacuum,
   wherein (A) or (B) below is satisfied:
   (A) wherein, in providing the drum, the first shrink section and the second shrink section are provided with a plurality of first support plates and a plurality of second support plates, respectively, which are evenly distributed in the circumferential direction around the respective first and second shrink sections and arranged radially inside and radially movable with respect to the respective first and second shrink surfaces so as to support said respective shrink surfaces in the level position and the shrink position; or
   (B) wherein, in providing the drum, the first shrink section and the second shrink section are each provided with a plurality of profile segments that are placed adjacently to each other in a direction parallel to the central axis, wherein the plurality of profile segments are arranged to be individually movable in the radial direction between a level position in which all the profile segments extend up to the same radial distance from the central axis and a retracted position in which the profile segments are individually moved radially inwards to form a non-level support profile to support the shrink surface in the shrink position.

2. The method according to claim 1, wherein the main circumferential surface of the drum remains at the first diameter during the movement of the shrink surfaces from the level position to the shrink position.

3. The method according to claim 1, wherein the shrink surfaces are level with the main circumferential surface in the level position.

4. The method according to claim 1, wherein the method further comprises the step of arranging a first reinforcement strip and a second reinforcement strip around the first tyre layer at the shrink surfaces of the first shrink section and the second shrink section, respectively.

5. The method according to claim 4, wherein the shrink surfaces, in the shrink position, are each recessed with respect to the level position over a shrink distance respectively that is equal to or less than a thickness of the respective reinforcement strip.

6. The method according to claim 4, wherein the shrink surfaces are moved to the shrink position prior to the arranging of the first reinforcement strip and the second reinforcement strip around the first tyre layer at the shrink surfaces of the first shrink section and the second shrink section, respectively.

7. The method according to claim 4, wherein the first reinforcement strip and the second reinforcement strip are arranged around the first tyre layer at the shrink surfaces of the first shrink section and the second shrink section, respectively, prior to the shrink surfaces moving to the shrink position.

8. The method according to claim 4, wherein the method further comprises the step of arranging one or more further tyre layers around the first tyre layer, the first reinforcement strip and the second reinforcement strip for forming a carcass in which the first reinforcement strip and the second reinforcement strip are arranged between the first tyre layer and the one or more further tyre layers in the radial direction.

9. The method according to claim 8, wherein the method further comprises the steps of:
   arranging a first bead and a second bead around the one or more further tyre layers,
      wherein the first shrink section and the second shrink section are positioned axially between the first bead and the second bead; and
   shaping a part of the carcass that is positioned axially between the first bead and the second bead, wherein the shaping comprises the steps of
      providing a shaping section between the first shrink section and the second shrink section, and
      creating an overpressure in the shaping section for inflating the part of the carcass axially between the first bead and the second bead, wherein the shaping section, the first shrink section and the second shrink section are arranged in fluid communication, and wherein the step of creating the partial vacuum between the shrink surfaces and the first tyre layer at the first shrink section and the second shrink section comprises creating a first partial vacuum in the shaping section and allowing the first partial vacuum in the shaping section to draw air from between the shrink surfaces and the first tyre layer at the first shrink section and the second shrink section.

10. A drum for manufacturing a tyre, the drum comprising:

a central axis; and a main circumferential surface extending concentrically around said central axis at a first diameter, wherein the drum is provided with a first shrink section and a second shrink section at spaced apart positions in the axial direction of the drum, wherein each of the first shrink section and the second shrink section is provided with a shrink surface that is movable between a level position in which the shrink surface is level with the main circumferential surface of the drum at the first diameter and a shrink position in which the shrink surface is moved radially inwards with respect to the central axis from the level position to a shrink position in which the drum, at the shrink surfaces of the first shrink section and the second shrink section, has a circumference with a second diameter that is smaller than the first diameter, wherein the drum is arranged for receiving a first tyre layer around the main circumferential surface and extending over the shrink surfaces at the first shrink section and the second shrink section, and wherein the drum is further provided with an air pump device that is operationally connected to the shrink sections for creating a partial vacuum between the shrink surfaces and the first tyre layer, wherein (A) or (B) below is satisfied:

(A) wherein the first shrink section and the second shrink section are provided with a plurality of first support plates and a plurality of second support plates, respectively, which are evenly distributed in the circumferential direction around the respective first and second shrink sections and arranged radially inside and radially movable with respect to the respective first and second shrink surfaces so as to support said respective shrink surfaces in the level position and the shrink position; or (B) wherein the first shrink section and the second shrink section are each provided with a plurality of profile segments that are placed adjacently to each other in a direction parallel to the central axis, wherein the plurality of profile segments are arranged to be individually movable in the radial direction between a level position in which all the profile segments extend up to the same radial distance from the central axis and a retracted position in which the profile segments are individually moved radially inwards to form a non-level support profile to support the shrink surface in the shrink position.

11. The drum according to claim 10, wherein the main circumferential surface of the drum is arranged to remain at the first diameter during the movement of the shrink surfaces from the level position to the shrink position.

12. The drum according to claim 10, wherein the shrink surfaces are level with the main circumferential surface in the level position.

13. The drum according to claim 10, wherein the shrink surfaces, at the side thereof facing the first tyre layer, are provided with venting elements which are arranged to create venting spaces between the first tyre layer and the shrink surfaces to allow air to be drawn from between the first tyre layer and the shrink surfaces.

14. The drum according to claim 10, wherein the drum is provided with a first sealing portion at each of the shrink sections, wherein each of the first sealing portions is arranged to abut the first tyre layer in a sealing manner at one of the ends of the respective shrink section in the axial direction, wherein the drum is provided with a second sealing portion at each of the shrink sections, wherein each of the second sealing portions is arranged to abut the first tyre layer in a sealing manner at the end of the respective shrink section in the axial direction opposite to the respective first sealing portion, and wherein the air pump device is operationally connected to the first shrink section and the second shrink section for creating a partial vacuum between the shrink surfaces, the first tyre layer, and the first sealing portion and the second sealing portion of the respective shrink sections.

15. The drum according to claim 10, wherein the drum is provided with a shaping section between the first shrink section and the second shrink section in the axial direction, wherein the air pump device is operationally connected to the shaping section, and wherein the shaping section is arranged in fluid communication with the first shrink section and the second shrink section.

16. The drum according to claim 10, wherein the shrink surfaces of the first shrink section and the second shrink section are formed by a first sealing member and a second sealing member, respectively, extending with elastic tension around the radial outside of the first shrink section and the second shrink section, respectively.

17. The drum according to claim 16, wherein the first sealing member and the second sealing member are evenly stretched around the radial outside of the first shrink section and the second shrink section, respectively.

18. The drum according to claim 10, wherein (A) is satisfied, wherein the first shrink section and the second shrink section are provided with the plurality of first support plates and the plurality of second support plates, respectively, which are evenly distributed in the circumferential direction around the respective first and second shrink sections and arranged radially inside and radially movable with respect to the respective first and second shrink surfaces so as to support said respective shrink surfaces in the level position and the shrink position, and wherein the plurality of first support plates and the plurality of second support plates are arranged to be resiliently flexible in the radial direction between a first state for supporting the respective shrink surface in the level position and a second state for supporting the respective shrink surface in the shrink position.

19. The drum according to claim 18, wherein the plurality of first support plates and the plurality of second support plates are arranged to be moved by an actuator from the second state to the first state.

20. The drum according to claim 19, wherein the plurality of first support plates and the plurality of second support plates are biased to return from the first state to the second state,
wherein the second state is a natural state of the plurality of first support plates and the plurality of second support plate.

21. The drum according to claim 10,
wherein (A) is satisfied, wherein the first shrink section and the second shrink section are provided with the plurality of first support plates and the plurality of second support plates, respectively, which are evenly distributed in the circumferential direction around the respective first and second shrink sections and arranged radially inside and radially movable with respect to the respective first and second shrink surfaces so as to support said respective shrink surfaces in the level position and the shrink position,
wherein each support plate of the plurality of first support plates and the plurality of second support plates is provided with longitudinal edges facing directly adjacent support plates of the plurality of first support plates and of the plurality of second support plates in the circumferential direction of the drum,
wherein the longitudinal edges of each support plate of the plurality of first support plates and the plurality of second support plates are concave in a first state to allow the plurality of first support plates and the plurality of second support plates to respectively approach each other in a second state at a smaller second diameter.

22. The drum according to claim 10,
wherein (A) is satisfied, wherein the first shrink section and the second shrink section are provided with the plurality of first support plates and the plurality of second support plates, respectively, which are evenly distributed in the circumferential direction around the respective first and second shrink sections and arranged radially inside and radially movable with respect to the respective first and second shrink surfaces so as to support said respective shrink surfaces in the level position and the shrink position, and
wherein each support plate of the plurality of first support plates and the plurality of second support plates is weakened to change a behavior of the support plate during the return movement from a first state to a second state.

23. The drum according to claim 10,
wherein (B) is satisfied, wherein the first shrink section and the second shrink section are each provided with the plurality of profile segments that are placed adjacently to each other in the direction parallel to the central axis, wherein the plurality of profile segments are arranged to be individually movable in the radial direction between the level position in which all the profile segments extend up to the same radial distance from the central axis and the retracted position in which the profile segments are individually moved radially inwards to form the non-level support profile to support the shrink surface in the shrink position,
wherein each shrink section is provided with one or more rings,
wherein each ring is provided with a plurality of stopping surfaces for stopping the radially inward movement of the individual profile segments in accordance with their respective radial position within the non-level support profile.

24. The drum according to claim 10,
wherein (B) is satisfied, wherein the first shrink section and the second shrink section are each provided with the plurality of profile segments that are placed adjacently to each other in the direction parallel to the central axis, wherein the plurality of profile segments are arranged to be individually movable in the radial direction between the level position in which all the profile segments extend up to the same radial distance from the central axis and the retracted position in which the profile segments are individually moved radially inwards to form the non-level support profile to support the shrink surface in the shrink position,
wherein each shrink section comprises a shrink chamber with a flat circumferential bottom for receiving the plurality of profile segments,
wherein the plurality of profile segments comprises at least two profile segments with different lengths in the radial direction in accordance with their respective radial positions within the non-level support profile.

25. The drum according to claim 10,
wherein (B) is satisfied, wherein the first shrink section and the second shrink section are each provided with the plurality of profile segments that are placed adjacently to each other in the direction parallel to the central axis, wherein the plurality of profile segments are arranged to be individually movable in the radial direction between the level position in which all the profile segments extend up to the same radial distance from the central axis and the retracted position in which the profile segments are individually moved radially inwards to form the non-level support profile to support the shrink surface in the shrink position,
wherein each shrink section is provided with a plurality of individually adjustable stopping elements for stopping the radially inward movement of the individual profile segments in accordance with their radial position within the non-level support profile.

26. The drum according to claim 10,
wherein (B) is satisfied, wherein the first shrink section and the second shrink section are each provided with the plurality of profile segments that are placed adjacently to each other in the direction parallel to the central axis, wherein the plurality of profile segments are arranged to be individually movable in the radial direction between the level position in which all the profile segments extend up to the same radial distance from the central axis and the retracted position in which the profile segments are individually moved radially inwards to form the non-level support profile to support the shrink surface in the shrink position,
wherein each of the plurality of profile segments comprises a radially extending slot,
wherein each shrink section is provided with a radially movable actuator segment for moving the plurality of profile segments radially outwards to the level position,
wherein the actuator segment is provided with a leveling shaft that extends through and engages with the slots of all of the plurality of profile segments of the respective shrink section to move all of the engaged profile segments to the level position.

27. The drum according to claim 26,
wherein the actuator segment comprises a main body that acts as one of the plurality of profile segments,
wherein the respective shrink section comprises an adjustable stopper for limiting the range of movement of the main body in the radially inward direction in accordance with the position of said main body within the support profile.

28. The drum according to claim 10,
wherein (B) is satisfied, wherein the first shrink section and the second shrink section are each provided with the plurality of profile segments that are placed adjacently to each other in the direction parallel to the central axis, wherein the plurality of profile segments are arranged to be individually movable in the radial direction between the level position in which all the profile segments extend up to the same radial distance from the central axis and the retracted position in which the profile segments are individually moved radially inwards to form the non-level support profile to support the shrink surface in the shrink position,
wherein the plurality of profile segments are provided with mutually meshing cams and recesses,
wherein each shrink section is provided with a radially movable actuator segment for moving the plurality of profile segments radially outwards to the level position,
wherein the actuator segment is provided with a leveling shaft that is arranged to engage with the cams and/or recesses of the profile segments that are directly adjacent to the actuator segment to said directly engaged profile segments to the level position,
wherein the rest of the plurality of profile segments of the respective shrink section are arranged to be indirectly engaged by the meshing of the cams and recesses to move to the level position.

29. The drum according to claim 28,
wherein the actuator segment comprises a main body that acts as one of the plurality of profile segments,
wherein the respective shrink section comprises an adjustable stopper for limiting the range of movement of the main body in the radially inward direction in accordance with the position of said main body within the support profile.

30. The method according to claim 1, wherein (A) is satisfied, wherein, in providing the drum, the first shrink section and the second shrink section are provided with the plurality of first support plates and the plurality of second support plates, respectively, which are evenly distributed in the circumferential direction around the respective first and second shrink sections and arranged radially inside and radially movable with respect to the respective first and second shrink surfaces so as to support said respective shrink surfaces in the level position and the shrink position.

31. The method according to claim 1, wherein (B) is satisfied, wherein, in providing the drum, the first shrink section and the second shrink section are each provided with the plurality of profile segments that are placed adjacently to each other in the direction parallel to the central axis, wherein the plurality of profile segments are arranged to be individually movable in the radial direction between the level position in which all the profile segments extend up to the same radial distance from the central axis and the retracted position in which the profile segments are individually moved radially inwards to form the non-level support profile to support the shrink surface in the shrink position.

* * * * *